United States Patent
Zhu et al.

(10) Patent No.: US 12,078,510 B2
(45) Date of Patent: Sep. 3, 2024

(54) METHOD, APPARATUS, AND SYSTEM FOR MAP RECONSTRUCTION BASED ON WIRELESS TRACKING

(71) Applicants: Guozhen Zhu, Greenbelt, MD (US); Chenshu Wu, Hong Kong (CN); Beibei Wang, Clarksville, MD (US); K. J. Ray Liu, Potomac, MD (US); Oscar Chi-Lim Au, San Jose, CA (US)

(72) Inventors: Guozhen Zhu, Greenbelt, MD (US); Chenshu Wu, Hong Kong (CN); Beibei Wang, Clarksville, MD (US); K. J. Ray Liu, Potomac, MD (US); Oscar Chi-Lim Au, San Jose, CA (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 17/891,037

(22) Filed: Aug. 18, 2022

(65) Prior Publication Data
US 2023/0014580 A1   Jan. 19, 2023

Related U.S. Application Data

(63) Continuation-in-part of application No. 16/790,610, filed on Feb. 13, 2020, and a continuation-in-part of application No. 16/871,000, filed on May 10, 2020, now Pat. No. 11,500,056, and a continuation-in-part of application No. 16/871,004, filed on May 10, 2020,
(Continued)

(51) Int. Cl.
*G01C 21/00* (2006.01)
*H04W 64/00* (2009.01)

(52) U.S. Cl.
CPC ....... *G01C 21/387* (2020.08); *G01C 21/3841* (2020.08); *G01C 21/3867* (2020.08); *H04W 64/003* (2013.01)

(58) Field of Classification Search
CPC ........... G01C 21/3841; G01C 21/3867; G01C 21/387; H04W 64/003
See application file for complete search history.

(56) References Cited

U.S. PATENT DOCUMENTS

| | | | |
|---|---|---|---|
| 8,412,656 B1 * | 4/2013 | Baboo | G06Q 30/06 706/20 |
| 10,262,331 B1 * | 4/2019 | Sharma | H04W 4/029 |

(Continued)

*Primary Examiner* — Zhiyu Lu

(57) ABSTRACT

Methods, apparatus and systems for map reconstruction based on wireless tracking are described. In one example, a described system comprises: a sensor configured to collect sensing data in a venue and obtain a plurality of trajectories, and a processor. Each trajectory is a time series of spatial coordinates (TSSC) representing a path traversed by a respective object in the venue. Each TSSC is accompanied by at least one respective time series of sensing data (TSSD) collected while the respective object traverses the path in the venue. The processor is configured for: segmenting each TSSC and its accompanying at least one TSSD into segments, bundling the plurality of trajectories based on similarity measures between pairs of the segments, fusing the bundled trajectories to generate fused trajectories, computing a shape of the fused trajectories, and generating a map of the venue based on the computed shape.

21 Claims, 26 Drawing Sheets

Related U.S. Application Data and a continuation-in-part of application No. 16/909,913, filed on Jun. 23, 2020, and a continuation-in-part of application No. 16/945,827, filed on Aug. 1, 2020, now Pat. No. 11,444,710, and a continuation-in-part of application No. 16/945,837, filed on Aug. 1, 2020, now Pat. No. 11,439,344, and a continuation-in-part of application No. 17/019,270, filed on Sep. 13, 2020, and a continuation-in-part of application No. 17/113,023, filed on Dec. 5, 2020, and a continuation-in-part of application No. 17/149,625, filed on Jan. 14, 2021, and a continuation-in-part of application No. 17/149,667, filed on Jan. 14, 2021, and a continuation-in-part of application No. 17/180,763, filed on Feb. 20, 2021, and a continuation-in-part of application No. 17/180,762, filed on Feb. 20, 2021, and a continuation-in-part of application No. 17/180,766, filed on Feb. 20, 2021, and a continuation-in-part of application No. 17/214,841, filed on Mar. 27, 2021, now Pat. No. 11,500,058, and a continuation-in-part of application No. 17/214,836, filed on Mar. 27, 2021, now Pat. No. 11,500,057, and a continuation-in-part of application No. 17/352,185, filed on Jun. 18, 2021, and a continuation-in-part of application No. 17/352,306, filed on Jun. 20, 2021, and a continuation-in-part of application No. 17/492,599, filed on Oct. 2, 2021, now Pat. No. 11,448,727, and a continuation-in-part of application No. 17/492,598, filed on Oct. 2, 2021, now Pat. No. 11,448,728, and a continuation-in-part of application No. 17/537,432, filed on Nov. 29, 2021, and a continuation-in-part of application No. 17/539,058, filed on Nov. 30, 2021, and a continuation-in-part of application No. 17/540,156, filed on Dec. 1, 2021, and a continuation-in-part of application No. 17/827,902, filed on May 30, 2022, and a continuation-in-part of application No. 17/492,642, filed on Oct. 3, 2021, and a continuation-in-part of application No. 17/838,228, filed on Jun. 12, 2022, and a continuation-in-part of application No. 17/838,231, filed on Jun. 12, 2022, and a continuation-in-part of application No. 17/838,244, filed on Jun. 12, 2022, and a continuation-in-part of application No. 17/888,429, filed on Aug. 15, 2022.

(60) Provisional application No. 63/235,103, filed on Aug. 19, 2021, provisional application No. 63/253,083, filed on Oct. 6, 2021, provisional application No. 63/276,652, filed on Nov. 7, 2021, provisional application No. 63/281,043, filed on Nov. 18, 2021, provisional application No. 63/293,065, filed on Dec. 22, 2021, provisional application No. 63/308,927, filed on Feb. 10, 2022, provisional application No. 63/332,658, filed on Apr. 19, 2022, provisional application No. 63/349,082, filed on Jun. 4, 2022, provisional application No. 63/300,042, filed on Jan. 16, 2022, provisional application No. 63/354,184, filed on Jun. 21, 2022, provisional application No. 63/388,625, filed on Jul. 12, 2022.

(56) References Cited

U.S. PATENT DOCUMENTS

| | | | | |
|---|---|---|---|---|
| 10,671,075 | B1* | 6/2020 | Kobilarov | G06K 9/62 |
| 10,963,893 | B1* | 3/2021 | Sharma | G06K 9/6293 |
| 2012/0314935 | A1* | 12/2012 | Cheng | G06V 20/20 |
| | | | | 382/154 |
| 2017/0219359 | A1* | 8/2017 | Elhoushi | G01S 19/01 |
| 2017/0343353 | A1* | 11/2017 | Mahmoud | H04L 67/52 |
| 2019/0170521 | A1* | 6/2019 | Elhoushi | G01C 21/20 |

* cited by examiner

METHOD, APPARATUS, AND SYSTEM FOR MAP RECONSTRUCTION BASED ON WIRELESS TRACKING

CROSS-REFERENCE TO RELATED APPLICATIONS

The present application hereby incorporates by reference the entirety of the disclosures of, and claims priority to, each of the following cases:
(a) U.S. patent application Ser. No. 16/790,610, entitled "METHOD, APPARATUS, AND SYSTEM FOR WIRELESS GAIT RECOGNITION", filed Feb. 13, 2020,
(b) U.S. patent application Ser. No. 16/871,000, entitled "METHOD, APPARATUS, AND SYSTEM FOR WIRELESS TRACKING WITH GRAPH-BASED PARTICLE FILTERING", filed on May 10, 2020,
(c) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(d) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(e) U.S. patent application Ser. No. 16/945,827, entitled "METHOD, APPARATUS, AND SYSTEM FOR PROCESSING AND PRESENTING LIFE LOG BASED ON A WIRELESS SIGNAL", filed on Aug. 1, 2020,
(f) U.S. patent application Ser. No. 16/945,837, entitled "METHOD, APPARATUS, AND SYSTEM FOR WIRELESS SLEEP MONITORING", filed on Aug. 1, 2020,
(g) U.S. patent application Ser. No. 17/019,270, entitled "METHOD, APPARATUS, AND SYSTEM FOR VEHICLE WIRELESS MONITORING", filed on Sep. 13, 2020,
(h) U.S. patent application Ser. No. 17/113,023, entitled "METHOD, APPARATUS, AND SYSTEM FOR ACCURATE WIRELESS MONITORING", filed on Dec. 5, 2020,
(i) U.S. patent application Ser. No. 17/492,642, entitled "METHOD, APPARATUS, AND SYSTEM FOR MOVEMENT TRACKING", filed on Oct. 3, 2021,
(j) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(k) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(l) U.S. patent application Ser. No. 17/180,763, entitled "METHOD, APPARATUS, AND SYSTEM FOR WIRELESS WRITING TRACKING", filed on Feb. 20, 2021,
(m) U.S. patent application Ser. No. 17/180,762, entitled "METHOD, APPARATUS, AND SYSTEM FOR FALL-DOWN DETECTION BASED ON A WIRELESS SIGNAL", filed on Feb. 20, 2021,
(n) U.S. patent application Ser. No. 17/180,766, entitled "METHOD, APPARATUS, AND SYSTEM FOR WIRELESS MOTION RECOGNITION", filed on Feb. 20, 2021,
(o) U.S. patent application Ser. No. 17/214,841, entitled "METHOD, APPARATUS, AND SYSTEM FOR WIRELESS PROXIMITY SENSING", filed on Mar. 27, 2021,
(p) U.S. patent application Ser. No. 17/214,836, entitled "METHOD, APPARATUS, AND SYSTEM FOR WIRELESSLY TRACKING KEYSTROKES", filed on Mar. 27, 2021,
(q) U.S. patent application Ser. No. 17/352,185, entitled "METHOD, APPARATUS, AND SYSTEM FOR WIRELESS MICRO MOTION MONITORING", filed on Jun. 18, 2021,
(r) U.S. patent application Ser. No. 17/352,306, entitled "METHOD, APPARATUS, AND SYSTEM FOR WIRELESS MONITORING TO ENSURE SECURITY", filed on Jun. 20, 2021,
(s) U.S. Provisional Patent application 63/235,103, entitled "METHOD, APPARATUS, AND SYSTEM FOR NAMING IOT DEVICES FOR WIRELESS SENSING", filed on Aug. 19, 2021,
(t) U.S. Provisional Patent application 63/253,083, entitled "METHOD, APPARATUS, AND SYSTEM FOR WIRELESS SENSING, DETECTION AND TRACKING", filed on Oct. 6, 2021,
(u) U.S. patent application Ser. No. 17/492,599, entitled "METHOD, APPARATUS, AND SYSTEM FOR HUMAN RECOGNITION BASED ON GAIT FEATURES", filed on Oct. 2, 2021,
(v) U.S. patent application Ser. No. 17/492,598, entitled "METHOD, APPARATUS, AND SYSTEM FOR SOUND SENSING BASED ON WIRELESS SIGNALS", filed on Oct. 2, 2021,
(w) U.S. Provisional Patent application 63/276,652, entitled "METHOD, APPARATUS, AND SYSTEM FOR WIRELESSLY MONITORING VITAL SIGN AND PERIODIC MOTIONS", filed on Nov. 7, 2021,
(x) U.S. Provisional Patent application 63/281,043, entitled "METHOD, APPARATUS, AND SYSTEM FOR SENSING", filed on Nov. 18, 2021,
(y) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021,
(z) U.S. patent application Ser. No. 17/539,058, entitled "METHOD, APPARATUS, AND SYSTEM FOR HUMAN IDENTIFICATION BASED ON HUMAN RADIO BIOMETRIC INFORMATION", filed on Nov. 30, 2021,
(aa) U.S. patent application Ser. No. 17/540,156, entitled "METHOD, APPARATUS, AND SYSTEM FOR POSITIONING AND POWERING A WIRELESS MONITORING SYSTEM", filed on Dec. 1, 2021,
(bb) U.S. Provisional Patent application 63/293,065, entitled "METHOD, APPARATUS, AND SYSTEM FOR SPEECH ENHANCEMENT AND SEPARATION", filed on Dec. 22, 2021,
(cc) U.S. Provisional Patent application 63/300,042, entitled "METHOD, APPARATUS, AND SYSTEM FOR WIRELESS SENSING AND SLEEP TRACKING", filed on Jan. 16, 2022,
(dd) U.S. Provisional Patent application 63/308,927, entitled "METHOD, APPARATUS, AND SYSTEM FOR WIRELESS SENSING BASED ON MULTIPLE GROUPS OF WIRELESS DEVICES", filed on Feb. 19, 2022, (ee) U.S. Provisional Patent application 63/332,658, entitled "METHOD, APPARATUS, AND SYSTEM FOR WIRELESS SENSING", filed on Apr. 19, 2022, (ff) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022, (gg) U.S. Provisional Patent application 63/349,082, entitled "METHOD, APPARATUS, AND SYSTEM FOR WIRELESS SENSING VOICE ACTIVITY DETECTION", filed on Jun. 4, 2022, (hh) U.S. patent application Ser. No. 17/838,228, entitled "METHOD, APPARATUS, AND SYSTEM FOR WIRELESS SENSING BASED ON CHANNEL INFORMATION", filed on Jun. 12, 2022, (ii) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022, (jj) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022, (kk) U.S. Provisional Patent application 63/354,184, entitled "METHOD, APPARATUS, AND SYSTEM FOR MOTION LOCALIZATION AND OUTLIER REMOVAL", filed on Jun. 21, 2022, (ll) U.S. Provisional Patent application 63/388,625, entitled "METHOD, APPARATUS, AND SYSTEM FOR WIRELESS SENSING AND INDOOR LOCALIZATION", filed on Jul. 12, 2022, (mm) U.S. patent application Ser. No. 17/888,429, entitled "METHOD, APPARATUS, AND SYSTEM FOR RADIO BASED SLEEP TRACKING", filed on Aug. 15, 2022.

TECHNICAL FIELD

The present teaching generally relates to wireless tracking. More specifically, the present teaching relates to systems and methods for map reconstruction based on wireless tracking.

BACKGROUND

Indoor location-based services rely on indoor maps, which are yet widely available despite numerous efforts from the industry. Existing solutions employ costly hardware (e.g., lidar) to achieve accurate mapping of indoor environments, or resort to crowdsourcing for floor plan generation at the cost of precision due to inaccurate inertial sensing.

Location-Based Services (LBS) are gaining increasing popularity, such as navigation, location-based searching, and social network services, etc. This is thanks to the ever-growing presence of smart devices with built-in location systems and maps. However, most of these services are only available in outdoor environments. One of the most critical constraints to the development of indoor LBS is the lack of digital indoor maps. Although projects like Google Indoor Maps, Point Inside, and Micello Indoor Map aim at collecting indoor maps, the availability of indoor maps is still very limited considering the huge number of buildings worldwide. Furthermore, most floor plans are manually generated and uploaded in these projects. The traditional manual methods require professional technicians to draw the floor plan using specialized measurement devices, which is time-consuming, costly, and thus unaffordable to cover all buildings. In addition, potential changes in the indoor environment would require much effort to update the maps.

Efforts have been taken to generate indoor maps automatically. Solutions based on lidar and cameras could achieve moderate accuracy but are very costly and/or privacy-intrusive. Systems based on WiFi fingerprinting require dense Access Points (APs) deployment, which may not always be available, especially in home environments. Map reconstruction based on crowdsourced trajectories is also extensively studied. Leveraging data contributed by mobile participants, crowdsourcing-based map reconstruction makes it possible to efficiently generate maps with less cost. However, the existing crowdsourcing based map reconstruction methods mainly rely on inertial sensors, which are known to have limited accuracy due to accumulative errors.

To overcome the significant accumulative errors in inertial tracking (e.g., pedestrian dead-reckoning), existing approaches resort to 1) various auxiliary calibration by discovering potential reference anchors (e.g., elevators) in the environments and 2) hundreds of various trajectories collected by a large number of users with a long time of efforts. However, in many environments, especially private environments such as homes, such anchors are not available. It is also not practical to collect plenty of trajectories with long-time efforts from a large number of users. In view of these erroneous inertial sensing, it is desirable to have systems and methods for map reconstruction based on a high-accuracy yet still low-cost trajectory tracking.

SUMMARY

The present teaching generally relates to wireless tracking. More specifically, the present teaching relates to systems and methods for map reconstruction based on wireless tracking.

In one embodiment, a system for map generation is described. The system comprises: a sensor configured to collect sensing data in a venue and obtain a plurality of trajectories, and a processor. Each trajectory is a time series of spatial coordinates (TSSC) representing a path traversed by a respective object in the venue. Each TSSC is accompanied by at least one respective time series of sensing data (TSSD) collected while the respective object traverses the path in the venue. The processor is configured for: segmenting each TSSC and its accompanying at least one TSSD into segments, bundling the plurality of trajectories based on similarity measures between pairs of the segments, fusing the bundled trajectories to generate fused trajectories, computing a shape of the fused trajectories, and generating a map of the venue based on the computed shape.

In another embodiment, an apparatus for map generation is described. The apparatus comprises: a sensor and a processor communicatively coupled to the sensor. The sensor is configured to collect sensing data in a venue and obtain a plurality of trajectories. Each trajectory is a time series of spatial coordinates (TSSC) representing a path traversed by a respective object in the venue. Each TSSC is accompanied by at least one respective time series of sensing data (TSSD) collected while the respective object traverses the path in the venue. The processor is configured for: segmenting each TSSC and its accompanying at least one TSSD into segments, bundling the plurality of trajectories based on similarity measures between pairs of the segments, fusing the bundled trajectories to generate fused trajectories, computing a shape of the fused trajectories, and generating a map of the venue based on the computed shape.

In yet another embodiment, a method for map generation is described. The method comprises: obtaining sensing data and a plurality of trajectories in a venue, wherein: each trajectory is a time series of spatial coordinates (TSSC) representing a path traversed by a respective object in the venue, each TSSC is accompanied by at least one respective time series of sensing data (TSSD) collected while the respective object traverses the path in the venue; segmenting each TSSC and its accompanying at least one TSSD into segments; bundling the plurality of trajectories based on similarity measures between pairs of the segments; fusing the bundled trajectories to generate fused trajectories; computing a shape of the fused trajectories; and generating a map of the venue based on the computed shape.

Other concepts relate to software for implementing the present teaching on map reconstruction based on wireless tracking. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
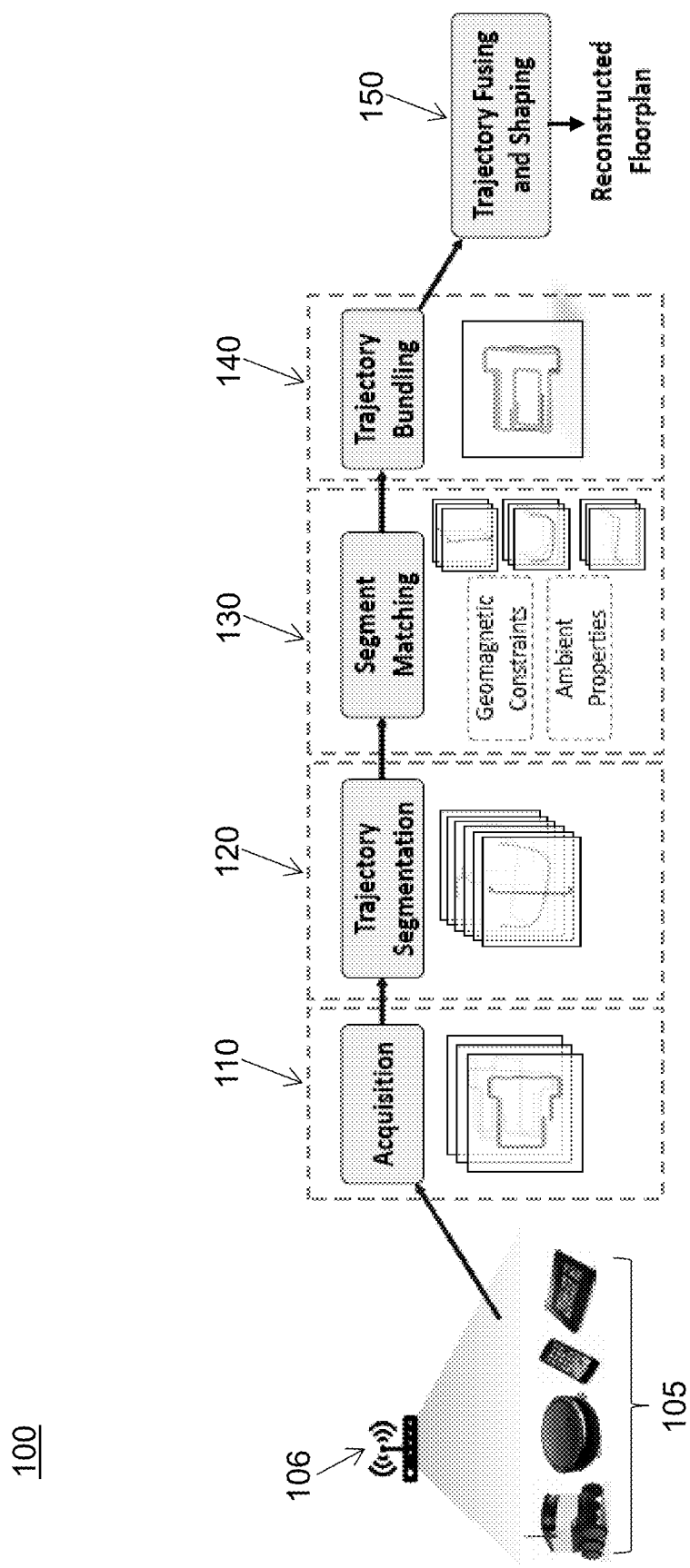
FIG. 1 illustrates an exemplary diagram of a map reconstruction system, according to some embodiments of the present disclosure.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a retraining, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time.

Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1-D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X-Y), (Y-X), abs(X-Y), $X^a$, $Y^b$, $abs(X^a-Y^b)$, $(X-Y)^a$, $(X/Y)$, $(X+a)/(Y+b)$, $(X^a/Y^b)$, and $((X/Y)^a-b)$, wherein a and b are may be some predetermined quantities. For example, the function may simply be abs(X-Y), or $(X-Y)^2$, $(X-Y)^4$. The function may be a robust function. For example, the function may be $(X-Y)^2$ when abs(X-Y) is less than a threshold T, and (X-Y)+a when abs(X-Y) is larger than T. Alternatively, the function may be a constant when abs(X-Y) is larger than T. The function may also be bounded by a slowly increasing function when abs(X-y) is larger than T, so that outliers cannot severely affect the result. Another example of the function may be (abs(X/Y)-a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that $X=(x\_1, x\_2, \ldots, x\_n)$ and $Y=(y\_1, y\_2, \ldots, y\_n)$. The function may be a function of at least one of: $x\_i$, $y\_i$, $(x\_i-y\_i)$, $(y\_i-x\_i)$, $abs(x\_i-y\_i)$, $x\_i^a$, $y\_i^b$, $abs(x\_i^a-y\_i^b)$, $(x\_i-y\_i)^a$, $(x\_i/y\_i)$, $(x\_i+a)/(y\_i+b)$, $(x\_i^a/y\_i^b)$, and $((x\_i/y\_)^a-b)$, wherein i is a component index of the n-tuple X and Y, and $1<=i<=n$, e.g. component index of $x\_1$ is i=1, component index of $x\_2$ is i=2. The function may comprise a component-by-component summation of another function of at least one of the following: $x\_i$, $y\_i(x\_i-y\_i)$, $(y\_i-x\_i)$, $abs(x\_i-y\_i)$, $x\_i^a$, $y\_i^b$, $abs(x\_i^a-y\_i^b)$, $(x\_i-y\_i)^a$, $(x\_i/y\_i)$, $(x\_i+a)/(y\_i+b)$, $(x\_i^a/y\_i^b)$, and $((x\_i/y\_i)^da-b)$, wherein i is the component index of the n-tuple X and Y. For example, the function may be in a form of $sum\_\{i=1\}^n (abs(x\_i/y\_i)-1)/n$, or $sum\_\{i=1\}^n w\_i*(abs(x\_i/y\_i)-1)$, where $w\_i$ is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i^\{th\}$ domain item is mapped to the $j^\{th\}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beam-forming information (including feedback or steering matrices generated by wireless communication devices, according to a standardized process, e.g., IEEE 802.11, or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement). They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface(UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1 a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device) to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

Recent advances in RF-based tracking enable high-accuracy trajectory tracking, allowing one to collect high-accuracy trajectories with cost-effective WiFi clients and a single AP for a broad variety of environments. However, leveraging RF-based tracking for high-precision floor plan construction entails great challenges. First, with only a single AP employed, one cannot have global reference information, which is necessary to connect different trajectories and construct a floor plan. Second, with only distance estimation available, there is still need to rely on inaccurate sensors for the direction information. Third, given the imperfect information, it is non-trivial to fuse trajectories collected by a robot to recover a floor plan.

In some embodiments, the present teaching overcomes the above challenges and discloses EZMAP, a novel system to boost the automatic construction of indoor floor plans. In some embodiments, EZMAP employs a commodity home robot, equipped with WiFi and inertial sensors, to roam around the environment and collect data. It requires only a single AP and can map not only public spaces such as malls and office buildings but also home environments that are barely explored by existing works. The reconstructed map represents hallway structure, room layout, as well as their sizes (i.e., corridor widths and room sizes). In some embodiments, EZMAP system uses a novel pipeline to generate such a map in three distinct ways. The EZMAP system may first break down the crowdsourced trajectories of arbitrary lengths into atomic segments, which circumvent the potential accumulative orientation errors and underpin trajectory matching. Second, the EZMAP system can use a robust hierarchical matching scheme to group the atomic segments. Taking advantage of the high-accuracy distance estimation, the EZMAP system may first match the atomic segments by their intrinsic geometric constrains. Then the EZMAP system can further classify them by examining the Received Signal Strength Indicator (RSSI) and magnetic field strength (MFS) information along each segment, providing global information about the actual location. Third, the EZMAP system can utilize a trajectory bundling and fusion technique to robustly embed the clustered segments, i.e., determining their positions relative to each other and thus reconstructing the floor plan.

In some embodiments, the EZMAP system can be implemented using commodity WiFi chipsets and inertial sensors, attached to a robot. The EZMAP system can be deployed at three different scenarios, i.e., a campus store, an office building, and a home. Leveraging a small number of crowdsourcing trajectories, the system generates detailed maps with high accuracy when implemented in an office building, a home environment, and a campus building. With the demonstrated high accuracy yet minimum infrastructure requirement, EZMAP paves the way for many important indoor applications for intelligent buildings and smart homes.

In some embodiments, the present teaching discloses an accurate automatic indoor map reconstruction system that applies to various indoor environments, including private environments such as homes, which do not have numerous WiFi APs. In some embodiments, the present teaching discloses an algorithm that accurately and robustly classifies, bundles, and embeds robot-collected trajectories to reconstruct an indoor map, which works with only one AP. The disclosed system can be implemented on commodity hardware to validate its performance in different buildings, demonstrating outstanding performance in offices, stores, and homes. Different from other systems, the disclosed system employs the increasingly popular home robots for data collection and extends the scope to home environments.

FIG. 1 illustrates an exemplary diagram of a map reconstruction system 100, according to some embodiments of the present disclosure. As shown in FIG. 1, the map reconstruction system 100 includes a Trajectory Acquisition module 110, a Trajectory Segmentation module 120, a Trajectory Matching module 130, a Trajectory Bundling module 140, and a Trajectory Fusing and Shaping module 150.

In some embodiments, the system can collect trajectories using a tracking device 105, which may be implemented on a robot, a human-pushed cart, a phone, a tablet, a computer, etc. In some embodiments, the tracking device 105 may include or serve as a Bot or receiver configured for receiving wireless signals from an Origin/Satellite or transmitter 106. Trajectories or traces can be acquired by the Trajectory Acquisition module 110 of the system based on the received wireless signals, which are impacted by the wireless channel and the motion of the tracking device 105.

In some embodiments, the traces can be collected by humans or robots with one AP deployed in the environment. The traces may contain the distance information obtained by an RF-based Inertial Measurement system and direction information derived from inertial sensors. RSSI of the AP and the MFS are also recorded. Then, the collected trajectories, which could be of arbitrary lengths, are divided into short segments, named as atomic segments, to overcome the potential errors accumulated in orientation while leveraging the accurate distance estimation (Trajectory Segmentation). The atomic segments are then clustered by their intrinsic geometric constraints as well as the accompanying time series of RSSI and MFS (Segment Matching). The clustered segments are then positioned by bundling the long trajectories and thereby inferring their relative positions (Trajectory Bundling). Then all trajectories are fused, taking their original shapes into account, to output the reconstructed map with corridor widths and room sizes (Trajectory Fusion and Shaping).

In some embodiments, the crowdsourcing trajectory tracking is based on RIM, an RF-based Inertial Measurement system, for distance estimation and inertial sensors for orientation estimation. RIM can serve as a sub-system of the disclosed map construction system and is good at estimating the moving distance of wheeled platforms and robots. Leveraging multipath profiles as virtual antennas with a super-resolution virtual antenna alignment algorithm, RIM achieves centimeter accuracy in moving distance over a multipath-rich area. RIM needs only a single AP, and captures Channel State Information (CSI) from data packets for its moving distance calculation. In some embodiments, EZMAP can utilize RIM's algorithm to estimate the moving distance with high accuracy while using inertial sensors to measure the turning angles and heading information, which together shape the geometric properties. For device setup, one can either use a pushing cart or a robot to carry the tracking device. In both cases, the tracking device may include customized hardware with a commodity WiFi chipset and IMU on it. In some embodiments, the EZMAP may include a software solution making no change to hardware.

The acquired trajectories come in various lengths from meters to tens of meters or even longer. In some embodiments, EZMAP prefers long trajectories in general, as they likely cover and connect wider areas and thus contain more information to be uniquely identified. However, long trajectories suffer from large accumulative errors particularly in orientation. To overcome the issues, the system can use the Trajectory Segmentation module 120 to decompose all collected trajectories into short pieces in a novel form of atomic segments that better preserve the accurate geometric shape information.

Figure 2:
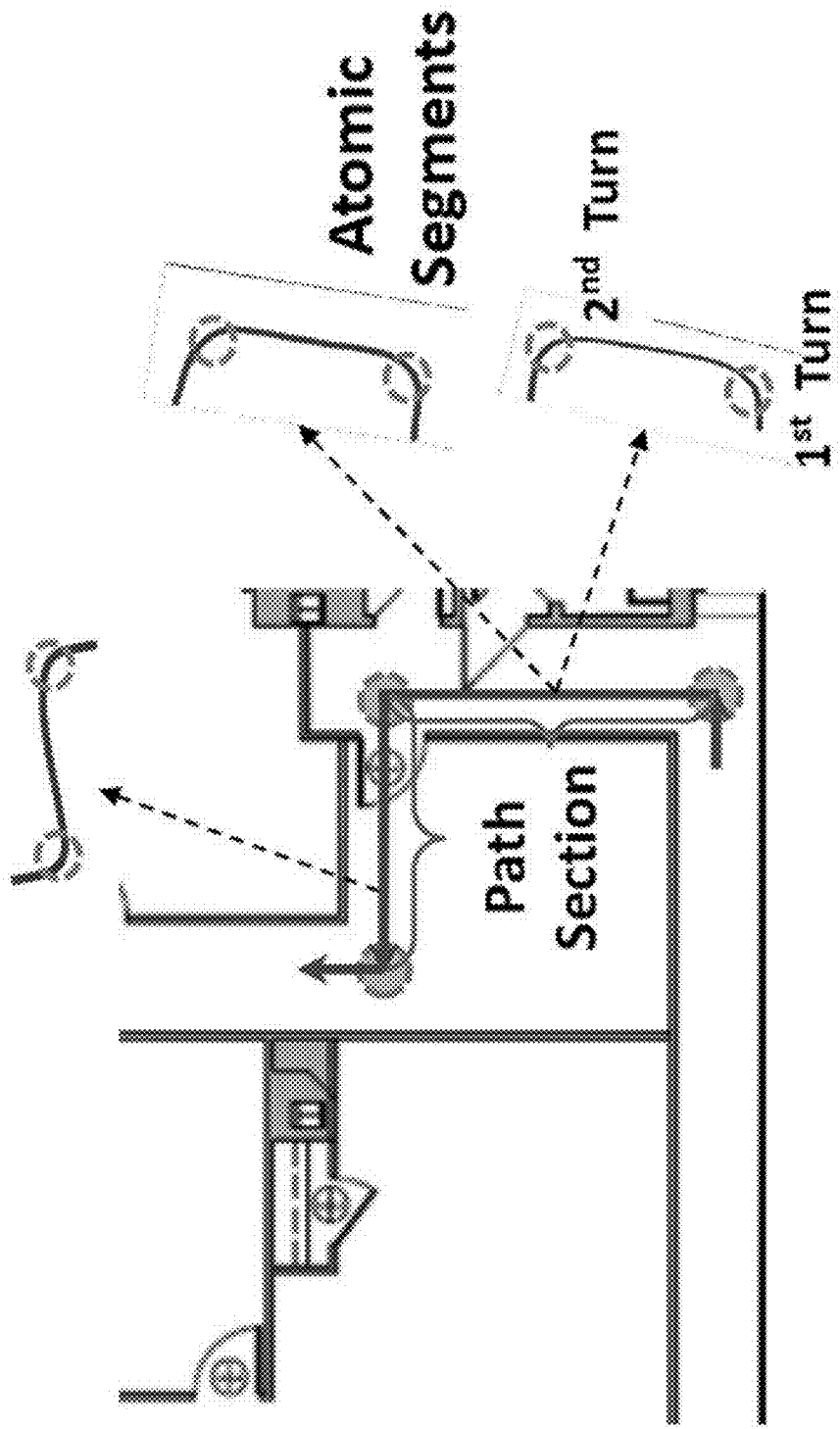
FIG. 2 illustrates an exemplary structure of atomic segments in a trajectory, according to some embodiments of the present disclosure.

In some embodiments, the system can divide each long trajectory into the structures that includes a straight segment with two turns on the two ends, as shown in FIG. 2. One can name such a structure an atomic segment and use it as the basic unit of trajectories in EZMAP. Such atomization can be accomplished by a simple turn detection based on inertial sensor readings. In some embodiments, the EZMAP system may calculate the change rate of angle (the first-order reciprocal of angle to time) of accelerometer and gyroscope data to detect turns.

The design of atomic segment is inspired by the below insights: First, the atomic segments disconnect the original trajectories at each turn, because orientation errors easily accumulate during a turn (as seen in the example in FIG. 3). As a result, it preserves the accurate distance information while resets significant orientation errors before they could accumulate over multiple turns. Second, the two turns are kept as parts of each atomic segment because they provide more information to cluster the segments that have similar lengths. Taking the segments in FIG. 2 as an example, two atomic segments, ending with a left turn and a right turn respectively, can be separated even when they have the same length. Third, considering real-world building layouts, such atomic segments can be frequently obtained. As will be demonstrated later, the global location information (i.e., RSSI and MFS time series) associated with such segments suffice to uniquely cluster and reconnect them, jointly considering the precise geometric shape of the segments.

In some embodiments, some trajectories will not be segmented by the atomization. For example, if the target circles around and moves along a curved pathway, the resulting trajectory would be continuously "turning" and will never be cut. These curved segments are still useful, as they possibly provide information about some open spaces and/or rooms, and will be handled separately.

To generate an accurate floor plan with tracking traces, one needs to accurately estimate the relative position of each trajectory, which is very challenging without global reference or the start point of each trajectory. As discussed before, the system can divide the long trajectories into atomic segments and resort to determining the relative position of each atomic segment. To accurately predict the relative position of each segment, the system can take two steps. In some embodiments, the system may first cluster the atomic segments belongings to the same location. Then the atomic segments in the same cluster are positioned and bundled by inferring its relative position from the long trajectory.

Figure 4:
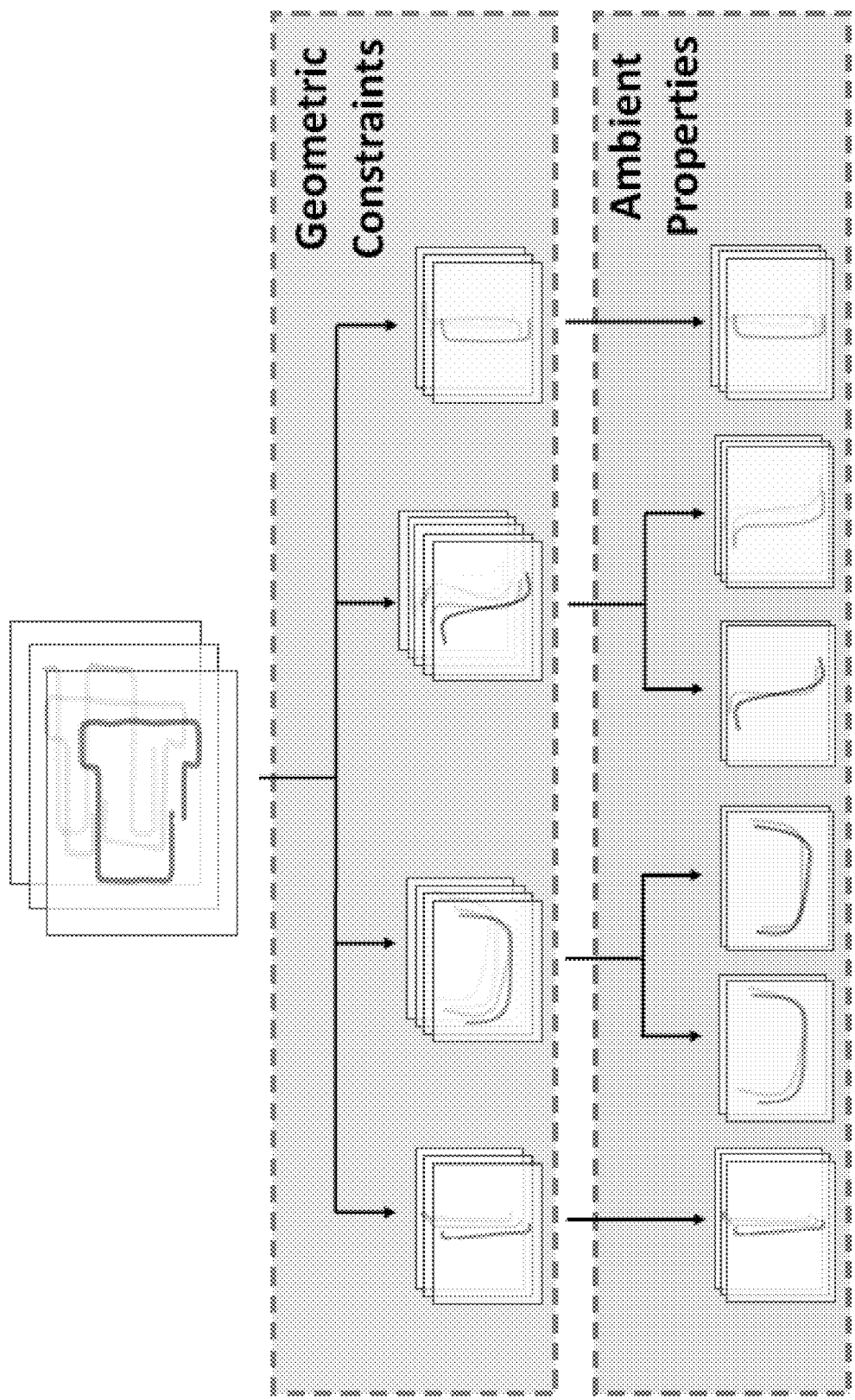
FIG. 4 illustrates an exemplary matching process of a map reconstruction system, according to some embodiments of the present disclosure.

To identify the segments at the same location and distinguish those at different locations, the system can utilize a trajectory matching algorithm at the Trajectory Matching module 130 to recognize the segments belonging to the same location and distinguish those belonging to different locations by their geometric shapes and time series of RSSI and MFS. An exemplary matching process is shown in FIG. 4.

With the unique structure designed for segments, each atomic segment has a geometric shape which contains the angle information of two turns and distance information of the road section in between. Atomic segments related to same path show similar geometric shapes. Geometric constraints are designed to sort the segments with similar shapes together based on their geometric shape information. Examples of atomic segments belonging to the same path are shown in FIG. 2.

The constraint of geometric shapes has two parts, distance constraint and angle constraint. As for the distance constraint, based on experimental observations and the distance tracking accuracy of the tracking client, one can limit the distance difference between segments on the same path to be no more than 3 m in some embodiments. In other words, if the difference of estimated distances of two road sections is greater than 3m, these two segments are unlikely to be at the same location. As for the angle constraint, considering certain angle errors, the angle difference between the same turn is limited to be no more than 30 degrees in some embodiments. In some embodiments, the atomic segments from the same location with different turnings (left and right) would not be clustered together. But this will not affect the final reconstructed map because they would be recognized and merged together later.

To verify the effectiveness of the geometric constraints, one can conduct a comparative experiment where over 200 atomic segments are used to compare the matching accuracy with and without geometric constraints. The experimental results validate that the trajectory constraint can effectively improve the accuracy of segment matching, which will be shown later.

In some embodiments, the geometric constraints alone are insufficient to support segment matching with high accuracy since it cannot separate the segments from different paths but having similar geometric shapes. Therefore, a robust global reference is crucial to the matching accuracy and the reconstruction performance. In some embodiments, the EZMAP system can leverage the time series of MFS and RSSI along the segment, denoted as ambient properties for global reference information and utilize a robust algorithm to match them.

Figure 5A:
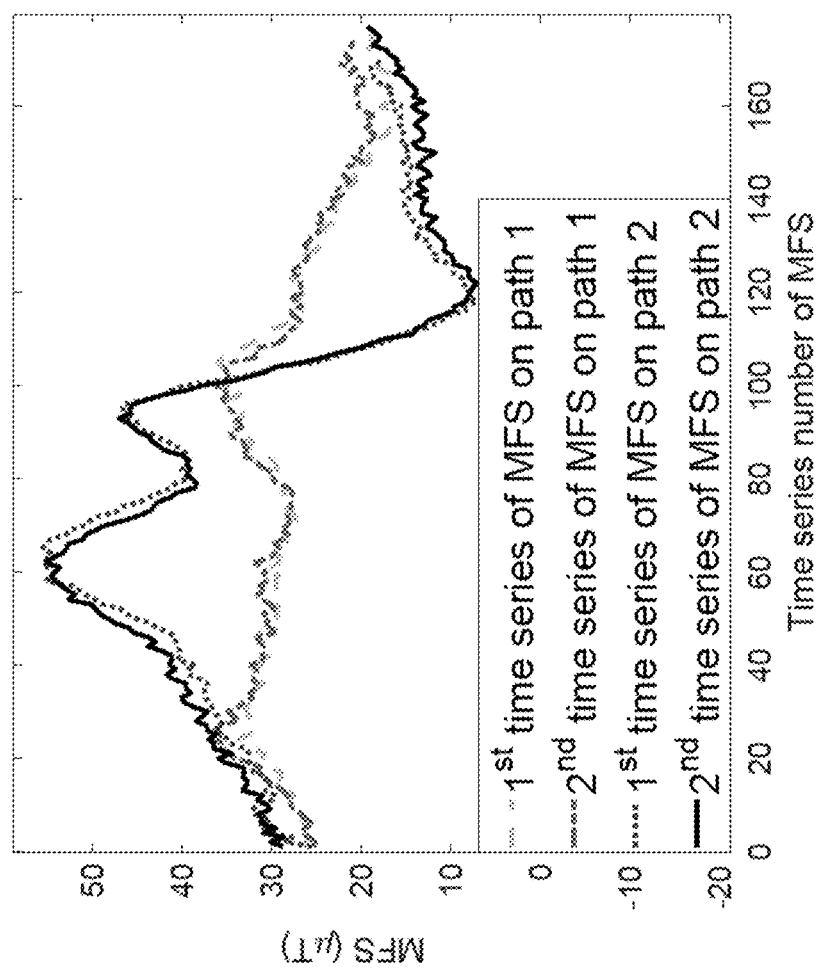
FIG. 5A illustrates an exemplary time series of magnetic field strength (MFS), according to some embodiments of the present disclosure.
Figure 5B:
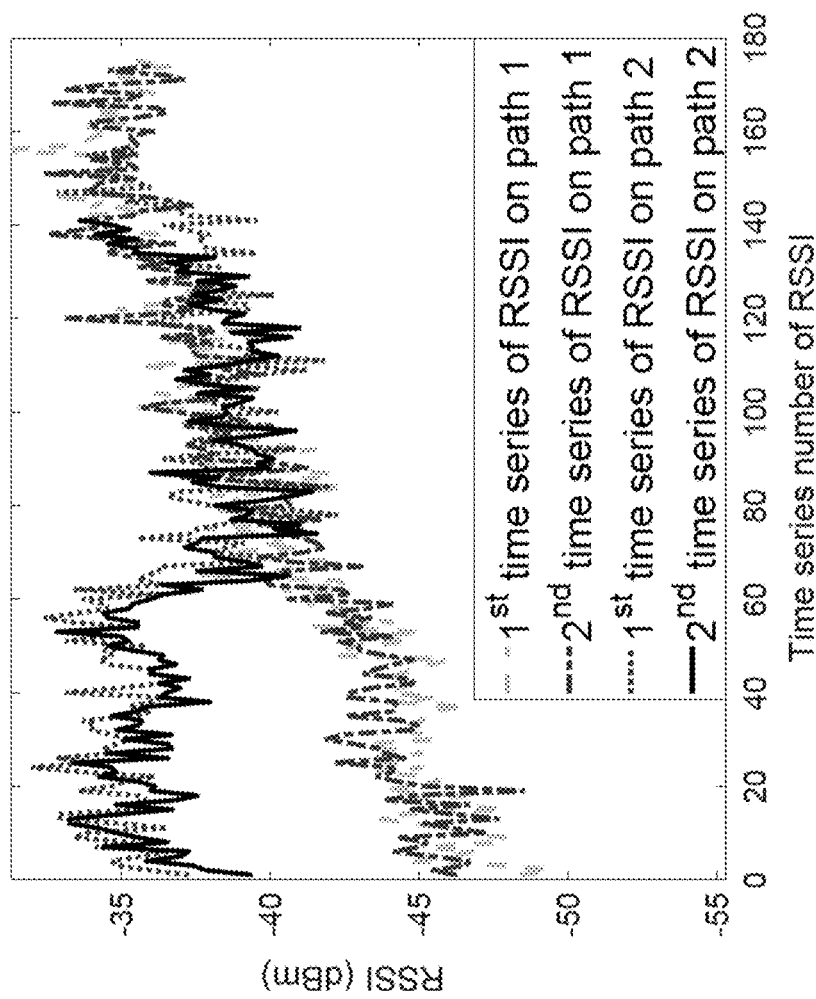
FIG. 5B illustrates an exemplary time series of Received Signal Strength Indicator (RSSI), according to some embodiments of the present disclosure.

The magnetic field anomalies caused by ferromagnetic construction materials (e.g., reinforcing steel bars) on the indoor path are generally stationary and unique over time. The time series of MFS are collected when a user or a robot walks along a specific indoor path and are used as the representative feature of the corresponding path. As shown in FIG. 5A, the time series of MFS data along the same indoor path is similar, while those along different indoor paths differ considerably. Similar characteristics also appear on the time series of RSSI values measured for a single AP, as shown in FIG. 5B. Although RSSI values at a single location suffer from very limited space resolution, a series of RSSI along a path provide more distinctive information.

In some embodiments, a cluster can be generated when the similarity value of two atomic segments based on the time series of MFS and RSSI is below a threshold. A similarity vector can be calculated for an atomic segment, measuring the similarity between itself and each existing cluster of atomic segments. For an atomic segment j, dynamic time warping (DTW) can be applied to calculate its RSSI similarity vector $D_{j,R}$ and MFS similarity vector $D_{j,M}$, respectively. $D_{j,R}$ and $D_{j,M}$ are normalized with min-max normalization and summed together to obtain the similarity vector as follows:

$$D_j = \overline{D_{j,R}} + \overline{D_{j,M}} = [d_{j,1}, d_{j,2}, \ldots, d_{j,i}, \ldots, d_{j,N}], \quad (1)$$

where $d_{j,i}$ denotes the similarity value between atomic segment j to the $i^{th}$ cluster, and N denotes the total number of clusters. If $d_{j,i}$ is below a pre-defined threshold (e.g., 0.2), this atomic segment is clustered to the $i^{th}$ cluster and can be matched with other segments from the $i^{th}$ cluster. If an atomic segment cannot be matched with any existing cluster, the system can generate a new cluster for it. Based on some experimental observations, two segments with a similarity value below 0.2 can be considered matched. As the system has normalized the RSSI vector and MFS vector during fusion, the threshold can be generalized to various environments.

In some corner cases, the threshold may not work well. For example, when: 1) the similarity value of two matched segments (i.e., two segments from the same location) is greater than 0.2, and 2) there are multiple similarity values lower than 0.2 but only one segment should be matched. In the first case, although the segments are mistakenly treated as belonging to two clusters, the system will be able to merge them together. As for the second case, the system will match the target segment with the most similar one, meaning the one with the smallest similarity value. The threshold is tested to be valid in experiments in three scenarios.

For the matched segments within the same cluster, the system can not only know that they should come from the same location but also have the alignment information between each pair of the segments, e.g., the system can have information about how each turn on the atomic segment corresponds to each other on the other matched segments.

After identifying the segments belonging to the same location, to reconstruct an accurate floor plan with these segments, the system may also identify their relative positions. In some embodiments, the system may utilize a trajectory bundling algorithm at the Trajectory Bundling module 140 to determine the position of atomic segments.

Figure 6:
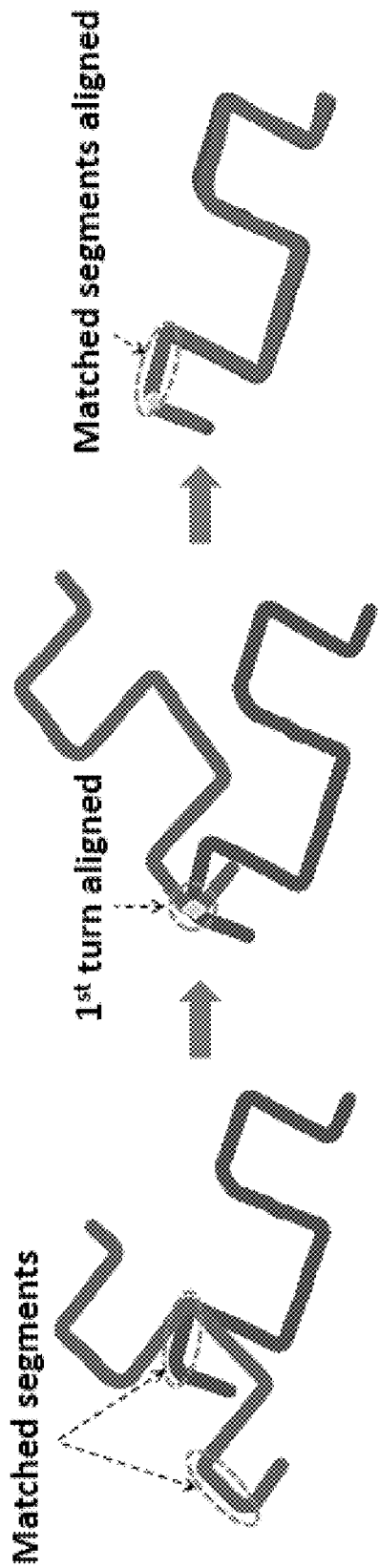
FIG. 6 illustrates an exemplary trajectory bundling process, according to some embodiments of the present disclosure.

In some embodiments, the long trajectories are bundled leveraging their matched atomic segments. For every two long trajectories that have matched segments, they are bundled in the following two steps: 1) The first turning points of two matched segments are stitched together. 2) The long trajectories are rotated so that the directions of the path section of the two matched atomic segments are consistent. Every long trajectory is bundled to others via aligning their matched segments. After long trajectories are bundled, the system can determine the coordinates of atomic segments by utilizing their spatial relationship on their original long trajectories. An example of trajectory bundling is shown in FIG. 6, where two trajectories are bundled by aligning their matched segments.

Figure 3:
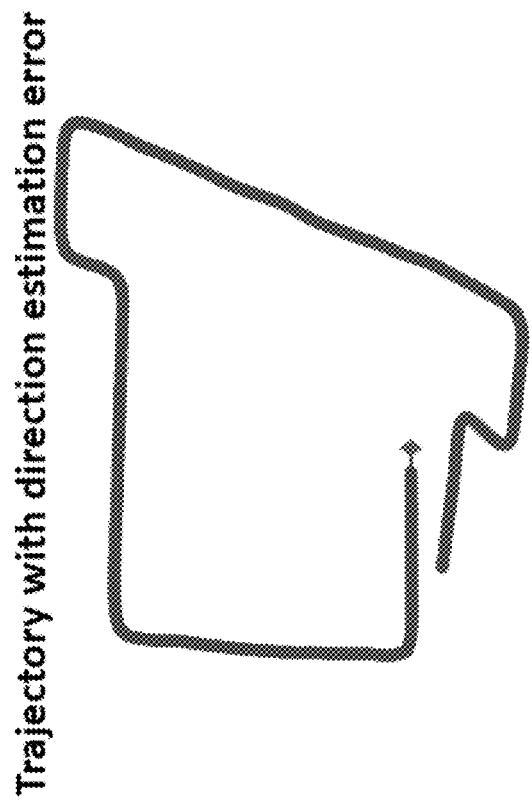
FIG. 3 illustrates exemplary errors accumulated at turns of a trajectory, according to some embodiments of the present disclosure.
Figure 3:
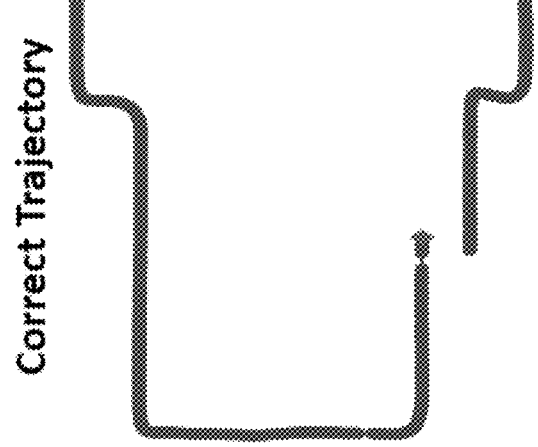

While the long trajectory is treated as a rigid body for trajectory bundling, the long trajectories containing large accumulative direction errors, as shown in FIG. 3, can reduce the accuracy of the generated map. As such, the system may adjust the positions of atomic segments on the long trajectory to avoid the impact of accumulated errors on the generated map, e.g. by the Trajectory Fusing and Shaping module 150.

Figure 7:
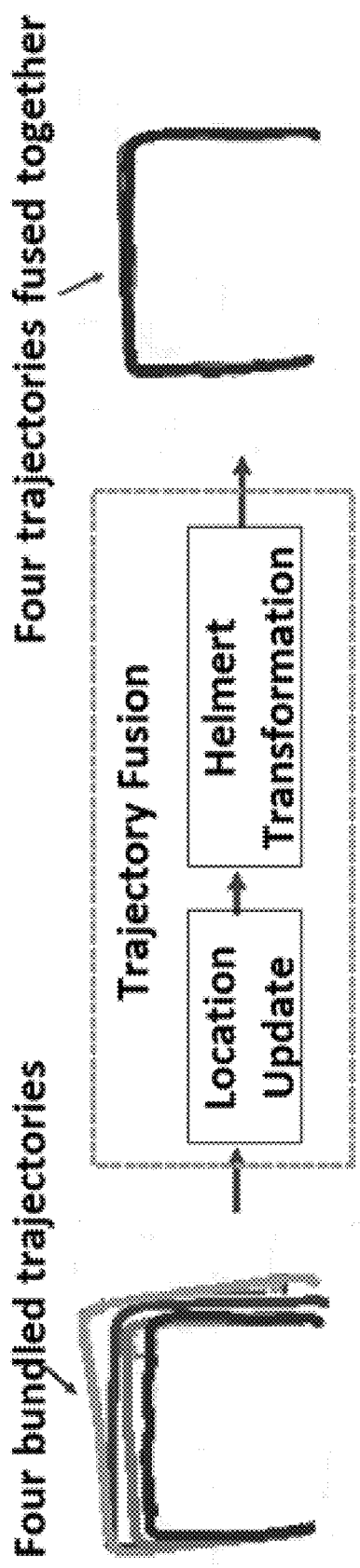
FIG. 7 illustrates an exemplary trajectory fusion process, according to some embodiments of the present disclosure.

Although the rough position of atomic segment can be inferred by bundling long trajectories, atomic segments belonging to the same path may have severe coordinate deviation, as shown in FIG. 7, which is undesirable. Therefore, the system can utilize a trajectory fusion algorithm to generate a more accurate and well-shaped map next, e.g. at the Trajectory Fusing and Shaping module 150.

Leveraging the characteristics of matched segments, the system can fuse matched atomic segments in two steps. First, for matched atomic segments at the same path, the inner-cluster constraints, including angle and positions of their turns, are utilized to update their positions. The system can calculate the medium coordinate of their endpoints at the same turn and update the coordinate of each endpoint by:

$$\text{New\_location} = (1-b)*\text{cluster\_medium\_location} + b*\text{original\_location}, \quad (2)$$

where $b \in (0,1)$ is a parameter balancing the cluster median location and original location.

Then, the intra-cluster global information can be leveraged to merge the turns that are mistakenly separated, which would happen when atomic segments on the same path are classified into different clusters. DTW can be applied again to merge the mistakenly separated turns. After the trajectories are bundled, the system can search for the turns within a small area. In some embodiments, the system may only apply the DTW on the turns close to each other. If the DTW distance of MFS and RSSI of two turns are below a threshold (e.g. 0.05 according to experiments), the two turns are considered to be at the same location and merged together. Thus, the mistakenly separated segments belonging to the same path are correctly merged.

Then, with the new coordinates of two endpoints, each atomic segment is transformed to its new position by Helmert transformation, a similarity transformation frequently used in geodesy to produce datum transformations between datums. Two dimensional Helmert transformation is performed here. With the knowledge of the original coordinate of two turning points and the updated coordinates of each point on the segments, Helmert Transformation calculates the updated coordinates of each point on the segments. The transformed segments preserve the shape and 2D information of the original atomic segments. FIG. 7 shows an example of trajectory fusion process, where Helmert Transformation is performed on four trajectories.

When segmenting the long trajectories, there are atomic segments without straight path section in between. Instead, they contain curved sections with continuous "turnings". While the straight segments, as discussed before, reflect the major layout of the building, the curved segments also contain useful information about rooms, curved corridors, and open spaces. Therefore, the system can separately process them to add more details to the recovered floor plan.

Figure 8:
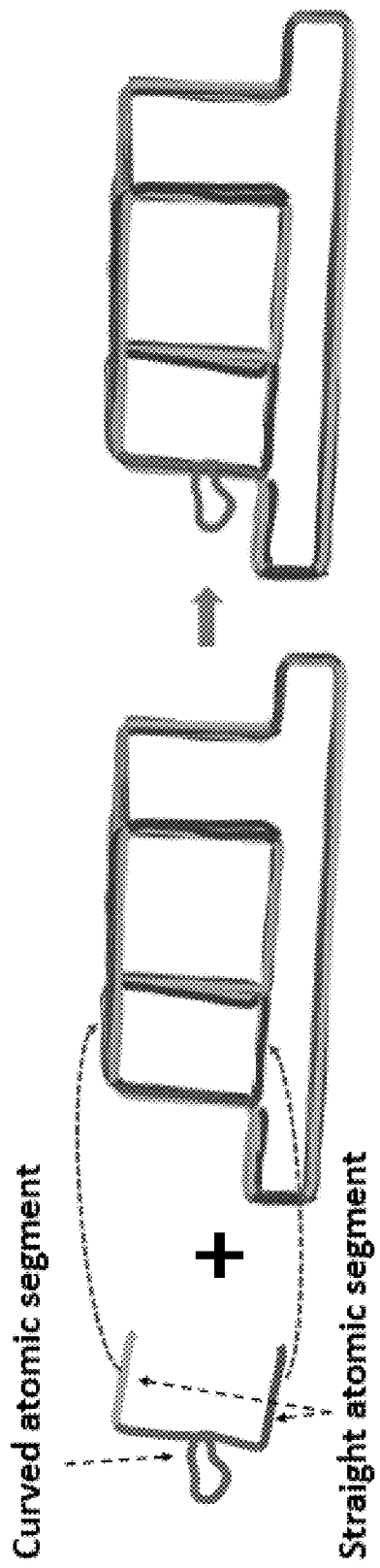
FIG. 8 illustrates an exemplary curved trajectory positioning process, according to some embodiments of the present disclosure.

In some embodiments, the position of the curved segment is deduced from its spatial relationship with straight segments. The system may first find out straight segments that directly connect with the curved segment. Then, the positions of straight segments are utilized to estimate the position of the curved segment and Helmert transformation is then performed on the curved segment. This process is shown in FIG. 8. Without losing the shape information, curved segments are grouped with straight segments to reconstruct the curve corridors, rooms and open spaces. Hence, the map construction algorithm can not only generate straight corridors, but also estimate the location and area of the rooms, making the floor plan more detailed and comprehensive. In some embodiments, to provide a well-shaped floor plan, an alpha-shape method is utilized to extract the contour of trajectories.

Figure 9A:
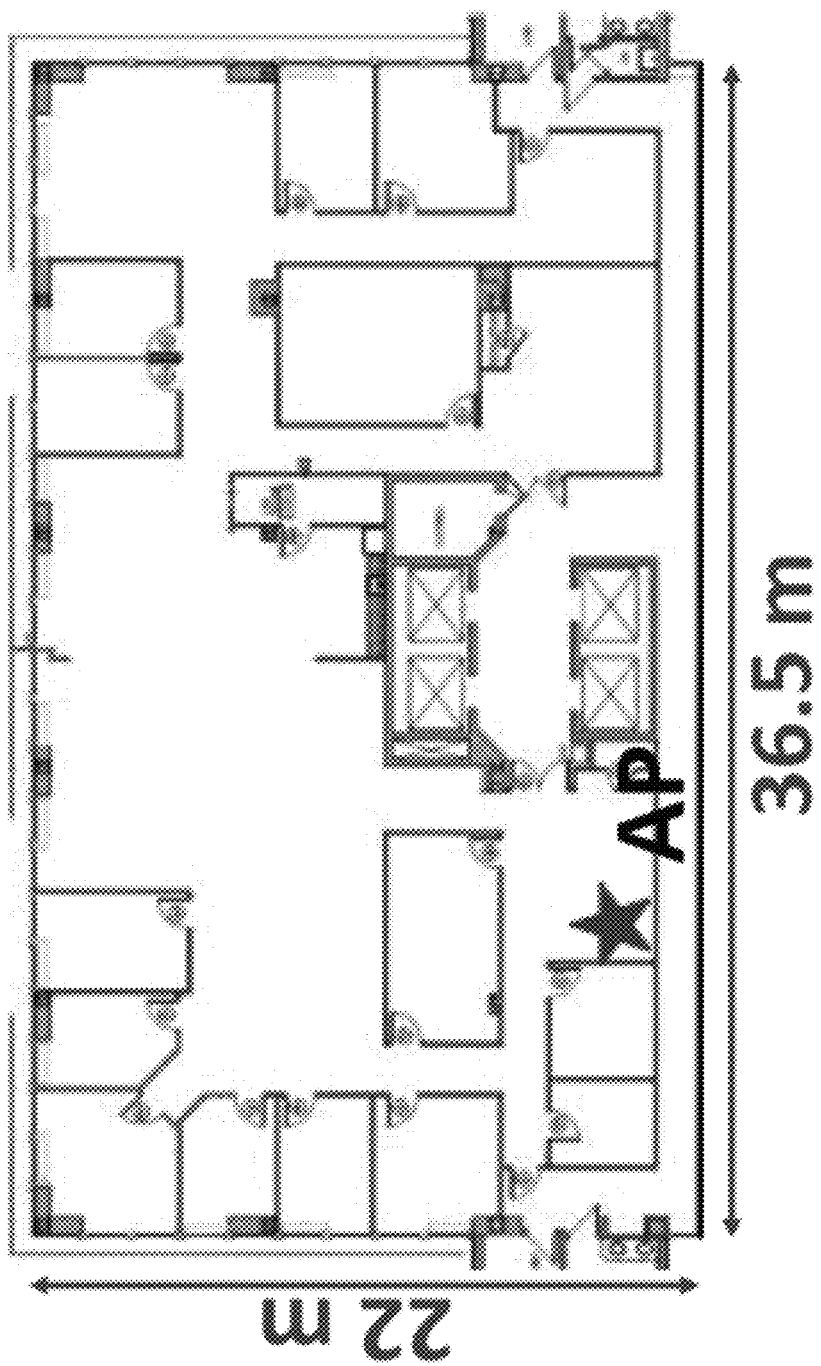
FIG. 9A illustrates an exemplary office floor plan used for testing a map reconstruction system, according to some embodiments of the present disclosure.
Figure 9B:
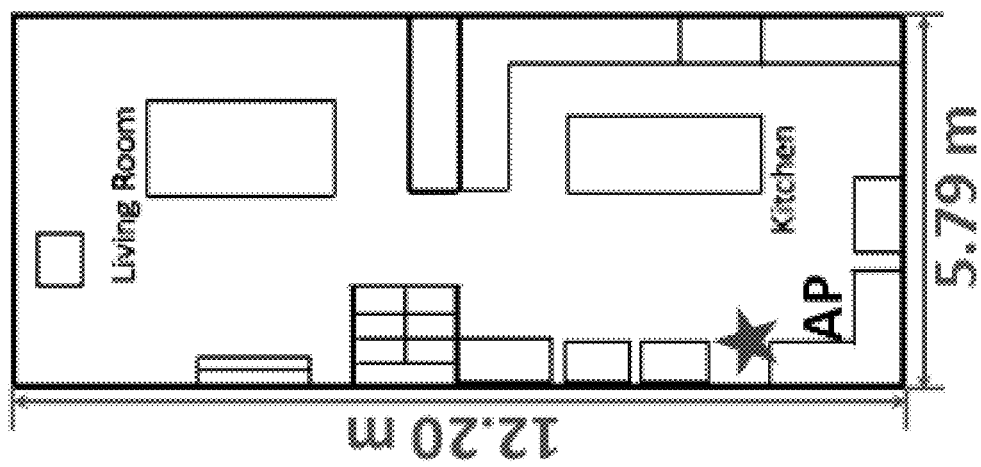
FIG. 9B illustrates an exemplary home floor plan used for testing a map reconstruction system, according to some embodiments of the present disclosure.
Figure 9C:
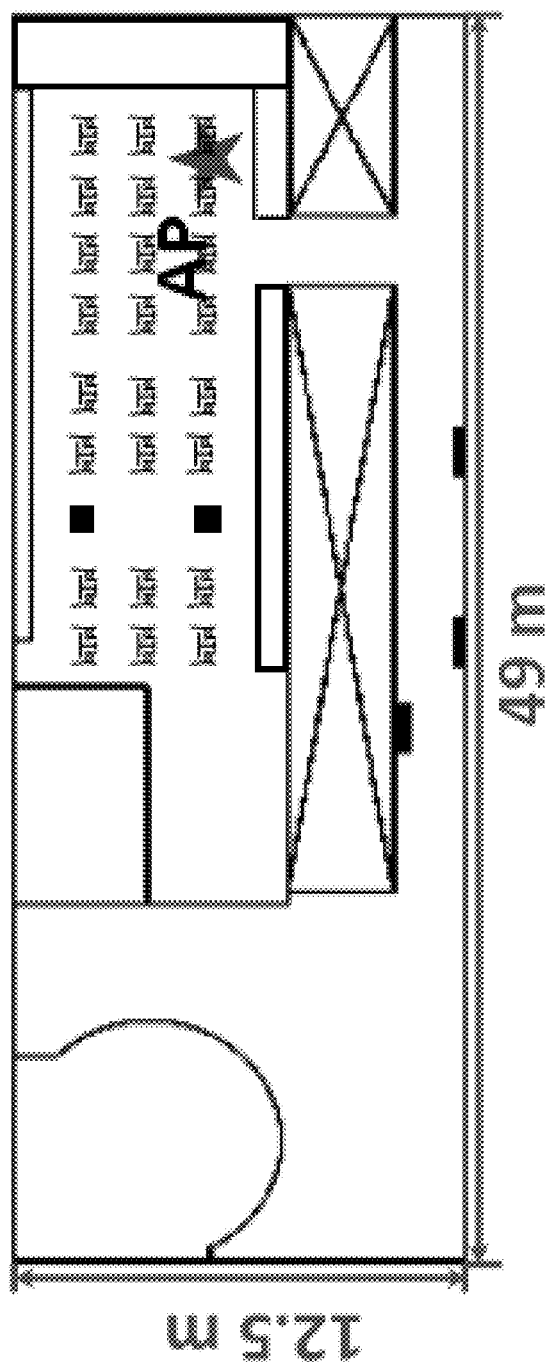
FIG. 9C illustrates an exemplary campus court floor plan used for testing a map reconstruction system, according to some embodiments of the present disclosure.
Figure 10B:
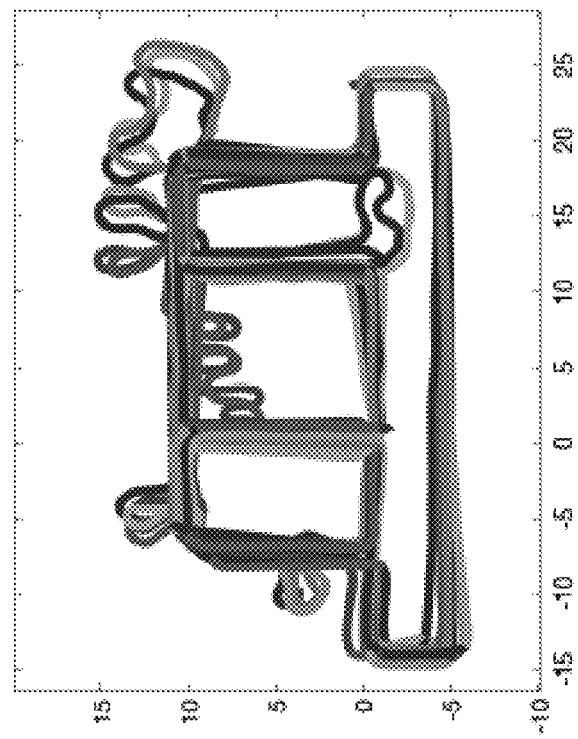
FIGS. 10A-10D illustrate exemplary reconstruction results of a map reconstruction system, according to some embodiments of the present disclosure.
Figure 10A:
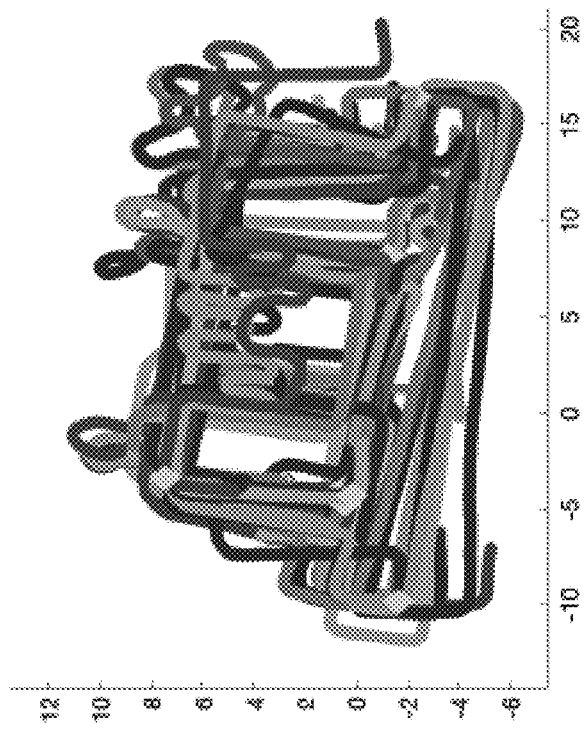
Figure 10D:
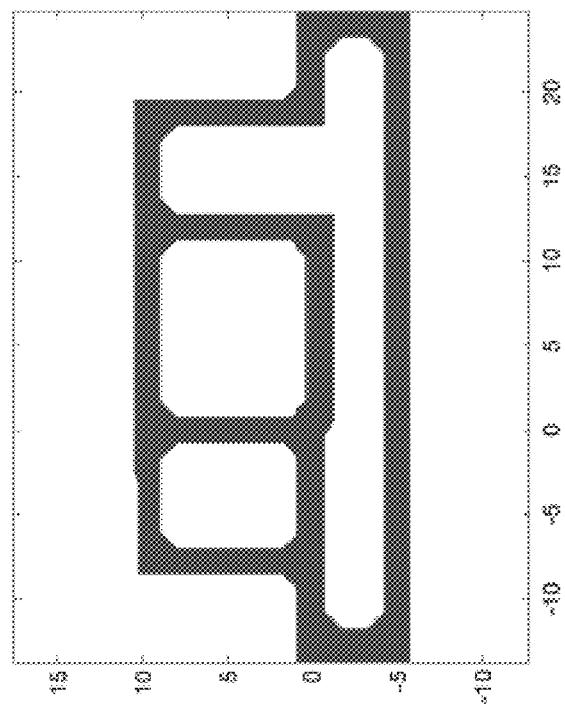
Figure 10C:
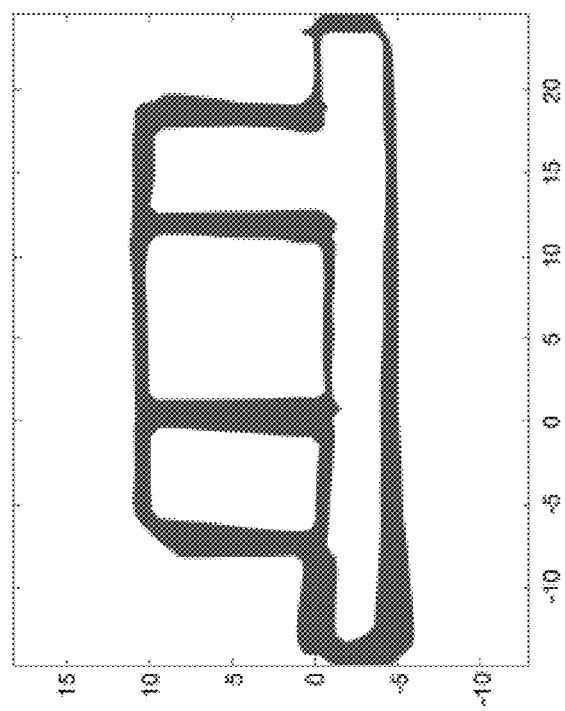
Figure 11B:
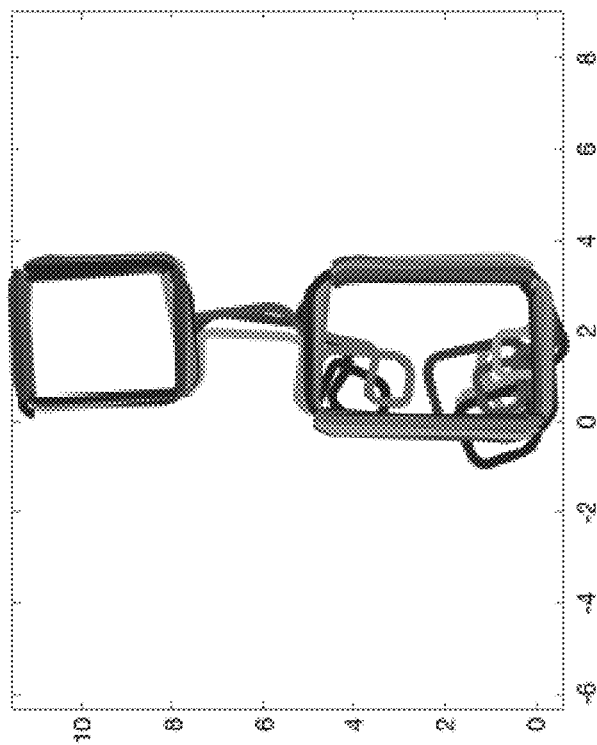
FIGS. 11A-11D illustrate other exemplary reconstruction results of a map reconstruction system, according to some embodiments of the present disclosure.
Figure 11A:
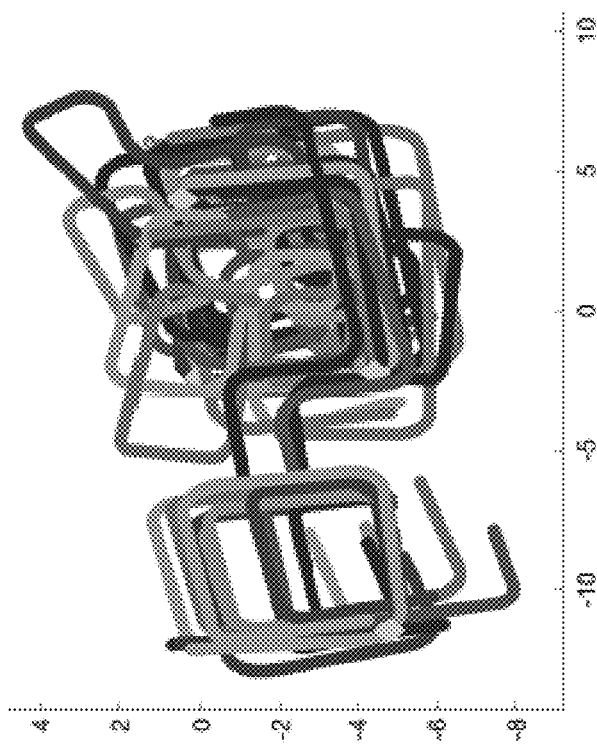
Figure 11D:
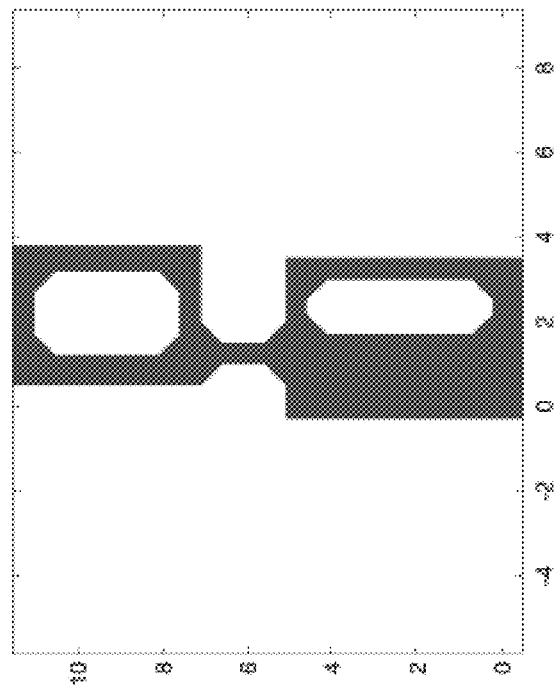
Figure 11C:
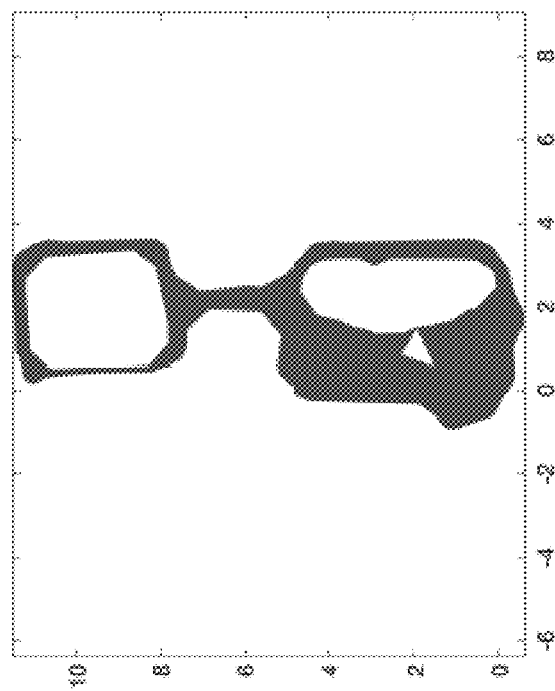
Figure 12B:
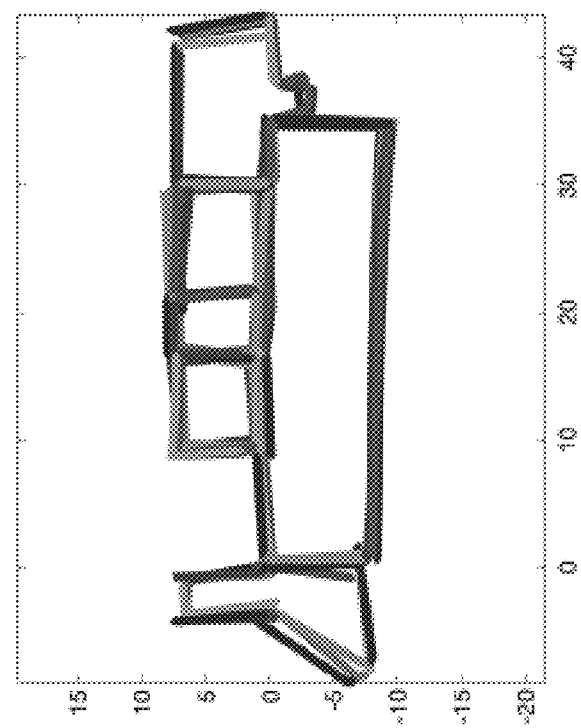
FIGS. 12A-12D illustrate additional exemplary reconstruction results of a map reconstruction system, according to some embodiments of the present disclosure.
Figure 12A:
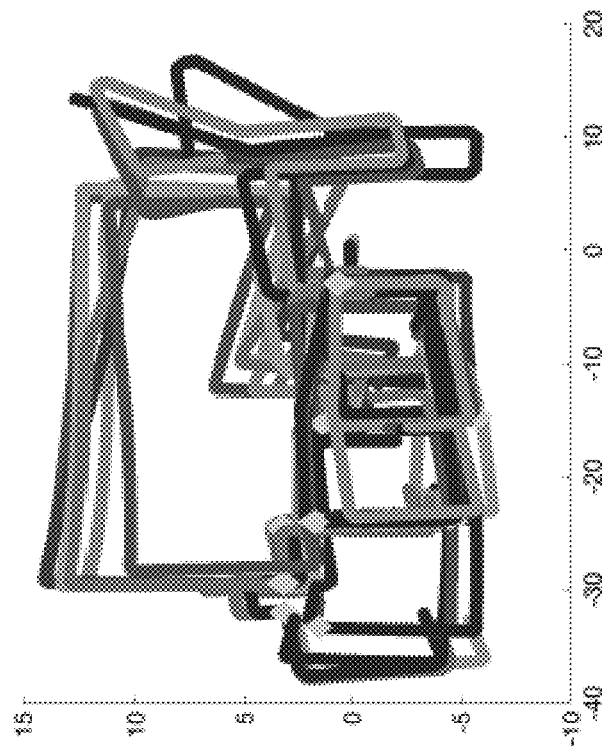
Figure 12C:
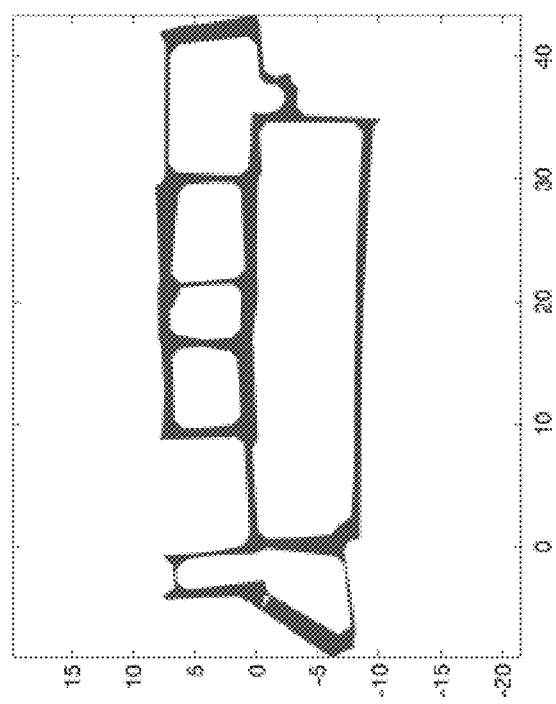
Figure 12D:
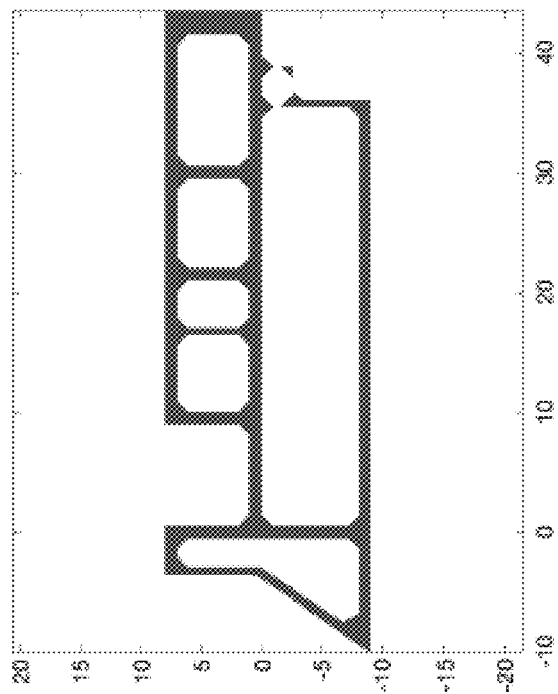
Figure 13A:
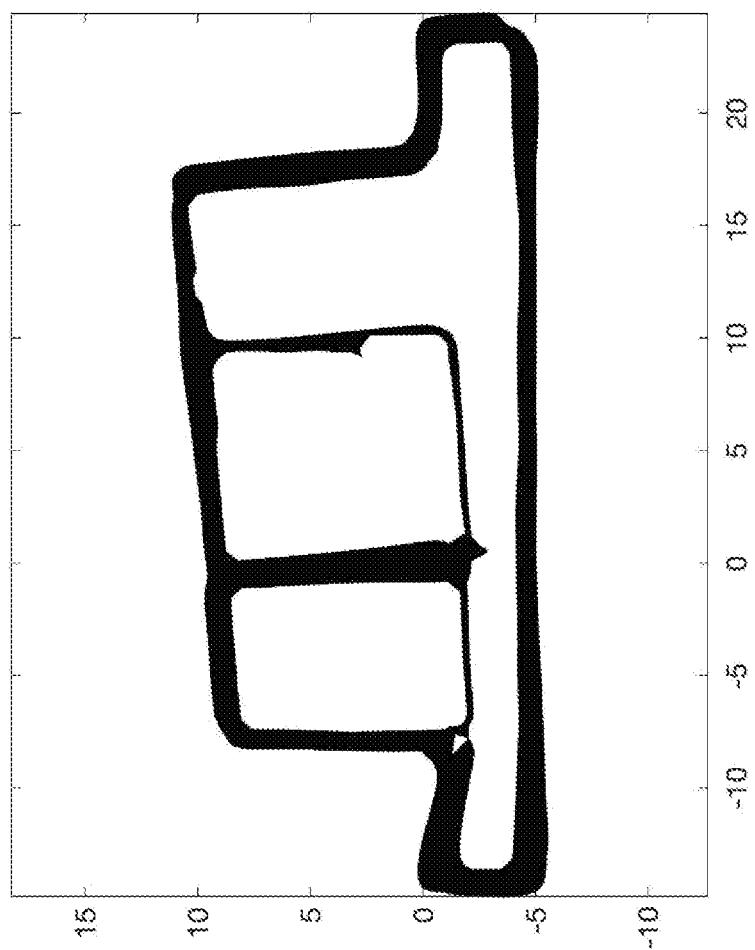
FIGS. 13A-13E illustrate exemplary reconstructed hallway plans of a map reconstruction system, according to some embodiments of the present disclosure.
Figure 13B:
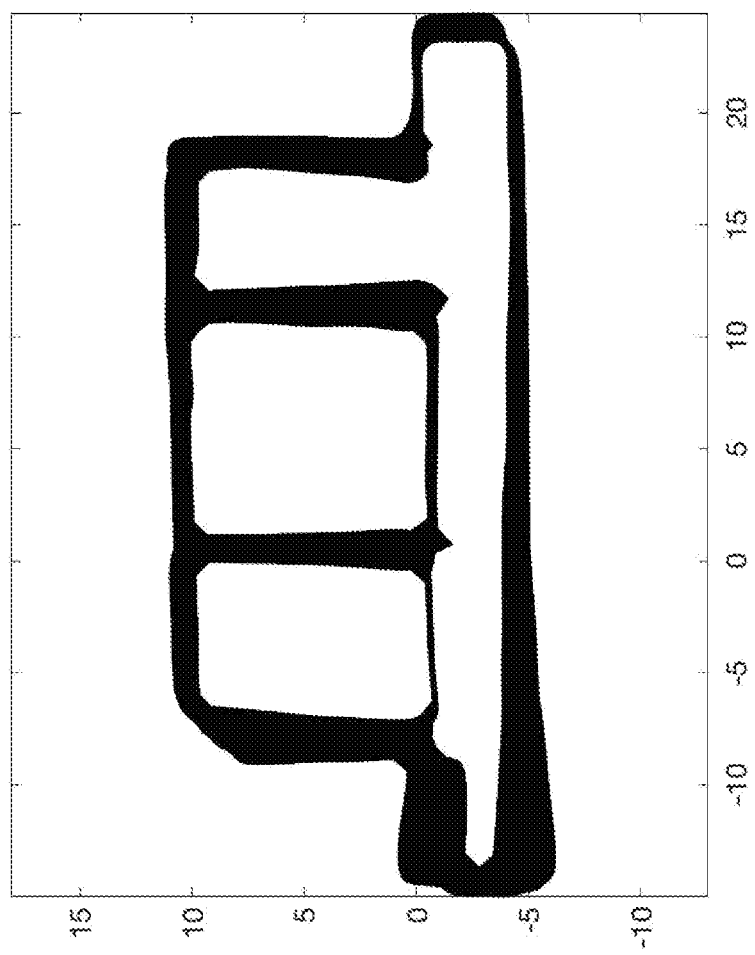
Figure 13C:
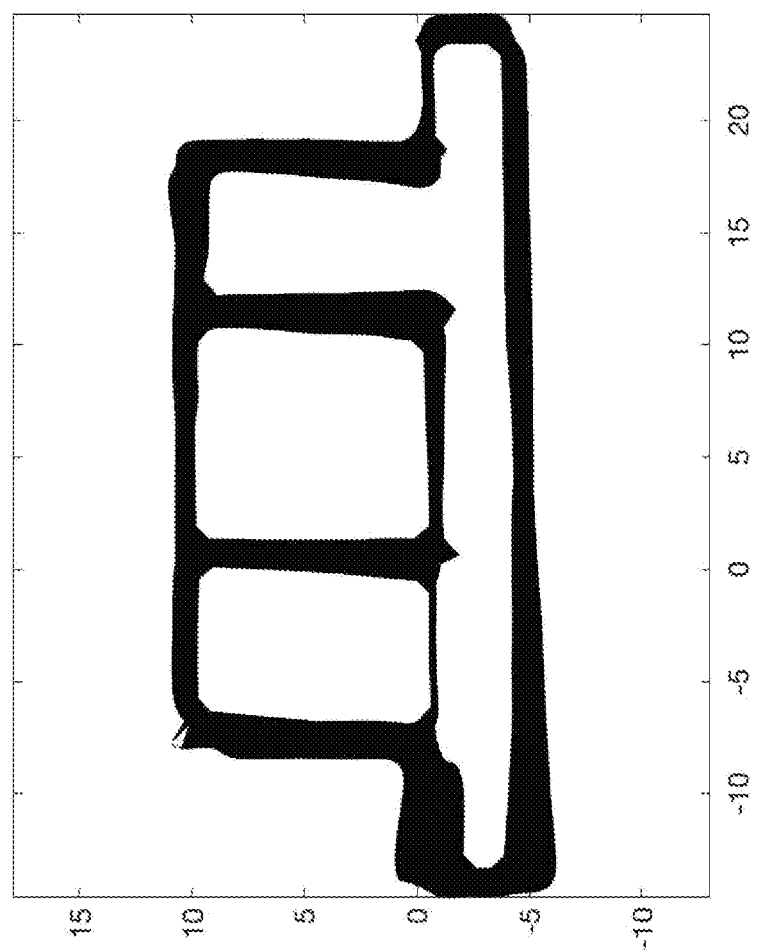
Figure 13D:
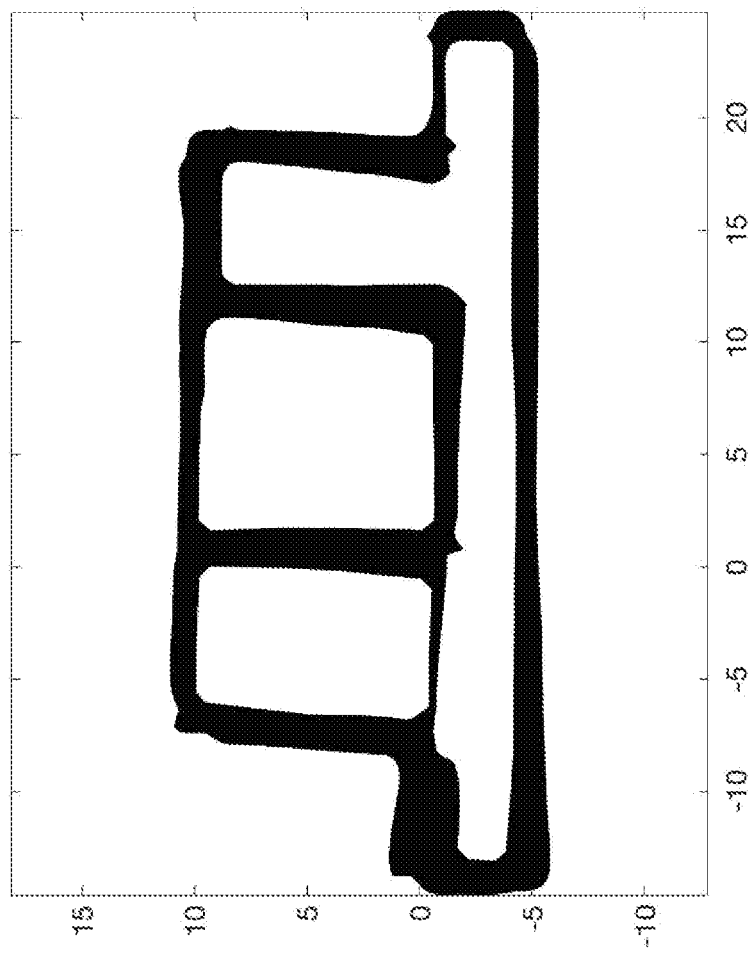
Figure 13E:
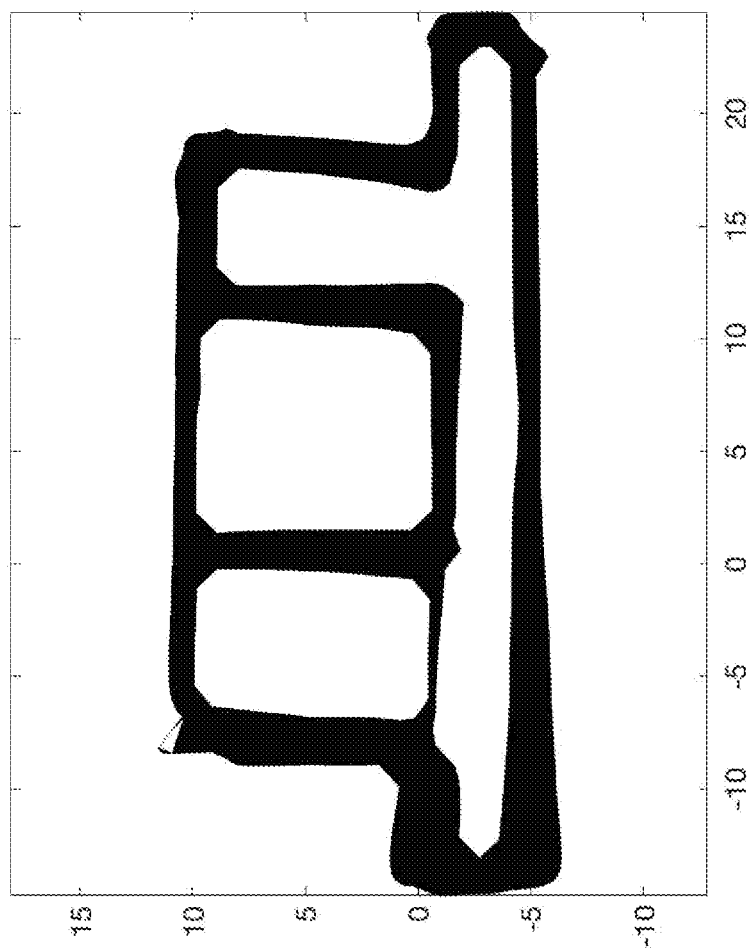

In some embodiments, the disclosed system and method are evaluated in three scenarios: Scenario I is an office with an area of 22.0 m×36.5 m, which includes corridors, rooms, doors, and elevators as shown in FIG. 9A; Scenario II is the second floor of a townhouse with an area of 5.8 m×12.2 m, including a kitchen and a living room as shown in FIG. 9B; and Scenario III is a dining court of a campus building with an area of 49.0 m×12.5 m, which includes a dining hall and hallways around it, as shown in FIG. 9C. The goal is to reconstruct the detailed floor plan using the disclosed system.

In Scenario I, the tracking device is installed on a cart pushed by human. Traces are collected on 12 different days in 5 months, with a total of 64 crowdsourcing trajectories collected. Since the different turning directions are considered, there are 18 clusters in this data set. In Scenarios II and III, the tracking device is equipped on a robot, which collects 49 trajectories with 8 clusters over 16 different days in 5 months for Scenario II, and 54 trajectories with 19 clusters on 7 different days in 2 months for Scenario III. One can collect data over a long course to validate the robustness of EZMAP over environmental dynamics, or only obtain a small amount of trajectories to demonstrate the effectiveness of the disclosed system.

In some embodiments, EZMAP employs a commodity home robot to collect data because it is labor-saving and efficient. Moreover, home robots are widely available nowadays. EZMAP is not limited to high-precision robotic tracking based on RIM. The disclosed map construction algorithm is also applicable to high-precision pedestrian tracking.

The results of the three scenarios are presented in FIGS. 10-12, respectively. For all three scenarios, the first subfigure (i.e., FIG. 10A, FIG. 11A, and FIG. 12A) shows the bundled trajectories. The reconstructed floor plan of Scenario I is shown in FIG. 10B, where the accessible area of rooms and open space are well reconstructed with curved trajectories. The reconstructed hallway plan of Scenario I is shown in FIG. 10C, while the ground-truth hallway plan extracted by alpha-shape is shown in FIG. 10D. In Scenario II, the reconstructed floor plan is shown in FIG. 11C, where the open space in Kitchen is well reconstructed by the disclosed system. Without the need of anchor points required by most related works, the disclosed system demonstrates the capability to reconstruct the floor plan for not only large and public areas, but also small and private environments like homes. FIG. 12C shows the well reconstructed floor plan of Scenario III. The result shows the disclosed system can accurately reconstruct the floor plan for a variety of areas with only a single AP.

The matching performance, room size accuracy, hallway shape accuracy and the construction efficiency of EZMAP are evaluated. As for hallway shape and room size, one can compare the disclosed system with SenseWit and CorwdInside.

In some embodiments, the matching performance is evaluated by purity measure and Normalized Mutual Information (NMI) score. The purity score $s_c$ is defined as $$s_c = \frac{1}{M}\sum_{i=1}^{c} C_i, \qquad (3)$$

where $C_i$ is the number of atomic segments in the largest class inside each cluster, c is the number of clusters and and M is the total number of atomic segments. The NMI is defined as $$NMI(Y, C) = \frac{2 \times I(Y; C)}{[H(Y) + H(C)]}, \qquad (4)$$

where Y denotes class labels, C denotes cluster labels, H(.) is Entropy, and I(Y; C) is Mutual Information between Y and C.

In one experiment according to some embodiments, one can collect 206 atomic segments belonging to 18 true clusters, which are clustered into 20 clusters. All the atomic segments belong to the largest class inside the cluster, except for one, resulting in a purity score of 99.51% and a normalized mutual information score of 95.05%.

To justify that the geometric constraint is very beneficial to atomic trajectory matching, a comparison experiment is conducted, where the matching performance is calculated without adopting the geometric constraint. The purity score drops to 87.38%, and the NMI score becomes 81.80%, proving that the geometric constraint can improve the matching performance significantly. On the other hand, it also demonstrates, surprisingly, that a reasonable accuracy of over 80% of segment matching could be achieved by using magnetism and RSSI of a single AP.

The room size is evaluated by the error between the reconstructed room size and ground truth area, which is calculated as:

$$\text{Error} = \frac{|\text{reconstructed\_room\_size} - \text{ground\_truth\_size}|}{\text{ground\_truth\_size}} \quad (5)$$

One can compare the error of the disclosed system with SenseWit and CrowdInside with the data collected in office. The average error of SenseWit is 31.4%, and that of CrowdInside is 40.6%. The disclosed system has an average error of 36.1%, which is lower than CrowdInside and higher than SenseWit. Without requiring lots of anchor points as SenseWit, the accuracy of the disclosed system is still comparable. The estimation error is mainly due to obstacles like tables, drawers, and chairs in the office, which prevent the cart or robot from walking through the entire room.

One can also evaluate the hallway shape with the same metric as SenseWit, which is shown below, $$\mathcal{P} = \frac{|S_{gen} \cap S_{true}|}{|S_{gen}|}, \quad (6)$$

$$\mathcal{R} = \frac{|S_{gen} \cap S_{true}|}{|S_{true}|},$$

$$\mathcal{F} = 2 * \frac{\mathcal{P} * \mathcal{R}}{\mathcal{P} + \mathcal{R}},$$

Where $\mathcal{P}$ is the precision of the hallway shape, $\mathcal{R}$ is the recall, and $\mathcal{F}$ is the harmonic mean of precision and recall. $\mathcal{P}$ is defined as the overlapped area divided by the reconstructed hallway area. $\mathcal{R}$ is defined as the overlapped area divided by the ground-truth hallway area.

The evaluation result is shown in Table I. The origin point and the orientation of ground truth hallway and the generated hallway are aligned. Table I shows that the $\mathcal{P}$, $\mathcal{R}$, and $\mathcal{F}$ of the disclosed system are better than CrowdInside and comparable with SenseWit. The precision of the disclosed system is higher than SenseWit, but recall rate is lower than SenseWit, which is because the disclosed system performs multi-trajectory fusion so that the hallway widths are less than the ground truths. SenseWit needs various anchors to achieve comparable performance with the disclosed system, showing that the disclosed system can generate accurate hallway plans for various environments, especially for the private environments without anchor points, such as home.

TABLE I

Evaluation Results of Hallway Shape

| | Disclosed system | SenseWit | CrowdInside |
|---|---|---|---|
| $\mathcal{P}$ | 78.18% | 75.3% | 59.5% |
| $\mathcal{R}$ | 75.10% | 82.4% | 47.1% |
| $\mathcal{F}$ | 76.61% | 78.69% | 52.0% |

Different from most crowdsourcing based indoor map construction system, EZMAP can generate hallway map with much fewer trajectories while achieving comparable precision. One can evaluate the construction efficiency of EZMAP in Scenario I. FIGS. 13A-13E show the reconstructed hallway with a number of 24, 35, 46, 52, and 61 trajectories, respectively. The hallway construction accuracy with different number of trajectories is 53.76%, 67.44%, 71.99%, 73.46%, and 76.61%, respectively. The comparison of EZMAP, SenseWit, and CrowdInside is shown in Table II. SenseWit used over 300 trajectories to cover a campus library with 464 m^2 area, and CrowdInside employed over 150 trajectories to cover an environment with 448 m^2 area. Table II shows that the disclosed system EZMAP achieves comparable accuracy to SenseWit with only one fourth of the number of trajectories used in a twice larger environment, and EZMAP is more accurate than CrowdInside with much less trajectories needed. The efficiency evaluation result shows that EZMAP can rapidly reconstruct accurate hallway. In addition, the design of EZMAP employs low-cost home robots, which also saves significant manpower for data collection.

TABLE II

Evaluation Results of Construction Efficiency

| | Disclosed system | SenseWit | CrowdInside |
|---|---|---|---|
| Trajectory Number | 61 | 300 | 150 |
| Area | 803 m$^2$ | 464 m$^2$ | 448 m$^2$ |
| Trajectory Number/Area | 0.08/m$^2$ | 0.65/m$^2$ | 0.33/m$^2$ |

In some embodiments, the present teaching discloses EZMAP, a universal automatic floor plan construction system that does not need any prerequisite knowledge of buildings in advance. EZMAP is a high-accuracy and low-cost floor plan reconstruction system leveraging advanced RF-based inertial tracking. The disclosed system combines local information from RF tracking with global contexts from inertial sensing (e.g., magnetic field strength) for an accurate map. EZMAP benefits from centimeter-accuracy indoor tracking using RF signals. It leverages commodity WiFi to estimate accurate moving distances and employs inertial sensors for orientation reckoning. EZMAP then processes crowdsourced trajectories with a novel pipeline of trajectory segmentation, matching, bundling, and shaping, which ultimately reconstructs a floor plan with not only skeletal layouts but also detailed area sizes of straight/curved corridors, open spaces, and rooms. Requiring minimal infrastructure and a small amount of data, EZMAP can scale to a number of various buildings including public malls, offices, as well as home environments.

EZMAP is the first RF-based system that can accurately reconstruct map of private environments. The performance can be validated with commodity WiFi in an office building or home, which shows that the disclosed system can efficiently generate faithful maps for a targeted area. With the ubiquitous deployment of WiFi devices, the disclosed system will advance the development of indoor location-based services.

Figure 14:
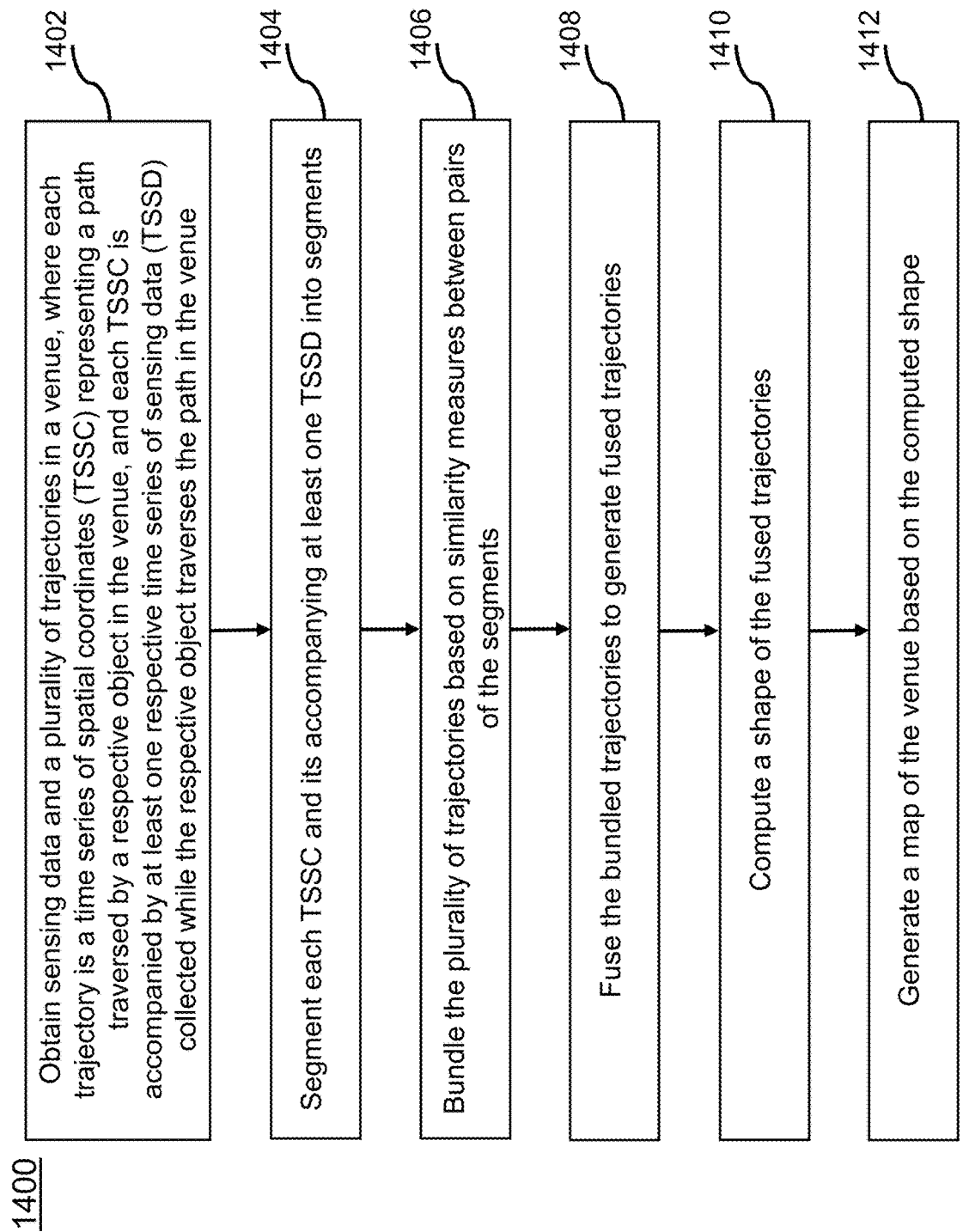
FIG. 14 illustrates a flow chart of an exemplary method for map reconstruction, according to some embodiments of the present disclosure.

FIG. 14 illustrates a flow chart of an exemplary method 1400 for map generation, according to some embodiments of the present disclosure. In various embodiments, the method 1400 can be performed by the systems disclosed above. At operation 1402, sensing data and a plurality of trajectories in a venue are obtained. Each trajectory is a time series of spatial coordinates (TSSC) representing a path traversed by a respective object in the venue. Each TSSC is accompanied by at least one respective time series of sensing data (TSSD) collected while the respective object traverses the path in the venue. In some examples, the sensing data and trajectories may be collected using channel information (e.g. CSI, CIR, CFR) captured from received wireless signal (e.g. based on signals according to WiFi, 4G/5G/6G/7G, etc.). In other examples, the sensing data and trajectories may be collected by other means such as radar, sensors, sensors in smart phones, navigation systems, etc.

At operation 1404, each TSSC and its accompanying at least one TSSD are segmented into segments. At operation 1406, the plurality of trajectories are bundled based on similarity measures between pairs of the segments. At operation 1408, the bundled trajectories are fused to generate fused trajectories. At operation 1410, a shape of the fused trajectories is computed. At operation 1412, a map of the venue is generated based on the computed shape. The order of the operations in FIG. 14 may be changed according to various embodiments of the present teaching.

Figure 15:
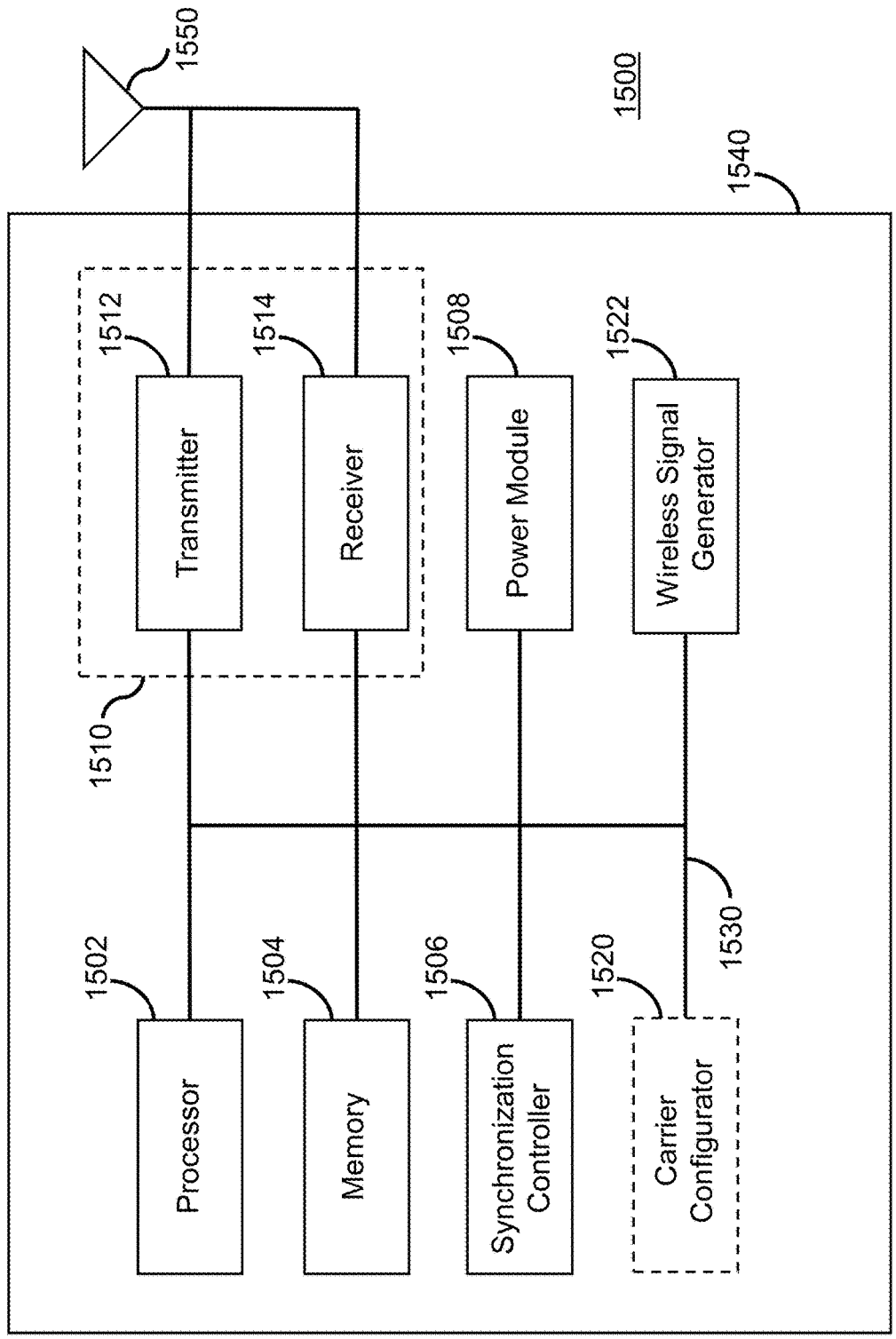
FIG. 15 illustrates an exemplary block diagram of a first wireless device of a system for map reconstruction, according to some embodiments of the present disclosure.

FIG. 15 illustrates an exemplary block diagram of a first wireless device 1500, e.g. an Origin/transmitter of a system for map reconstruction based on wireless tracking, according to some embodiments of the present disclosure. The device 1500 is an example of a device that can be configured to implement the various methods described herein. As shown in FIG. 15, the device 1500 includes a housing 1540 containing a processor 1502, a memory 1504, a transceiver 1510 comprising a transmitter 1512 and receiver 1514, a synchronization controller 1506, a power module 1508, an optional carrier configurator 1520 and a wireless signal generator 1522.

In this embodiment, the processor 1502 controls the general operation of the device 1500 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1504, which can include both read-only memory (ROM) and random access memory (RAM), can provide instructions and data to the processor 1502. A portion of the memory 1504 can also include non-volatile random access memory (NVRAM). The processor 1502 typically performs logical and arithmetic operations based on program instructions stored within the memory 1504. The instructions (a.k.a., software) stored in the memory 1504 can be executed by the processor 1502 to perform the methods described herein. The processor 1502 and the memory 1504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1510, which includes the transmitter 1512 and receiver 1514, allows the device 1500 to transmit and receive data to and from a remote device (e.g., a Bot or another Origin). An antenna 1550 is typically attached to the housing 1540 and electrically coupled to the transceiver 1510. In various embodiments, the device 1500 includes (not shown) multiple transmitters, multiple receivers, and multiple transceivers. In one embodiment, the antenna 1550 is replaced with a multi-antenna array 1550 that can form a plurality of beams each of which points in a distinct direction. The transmitter 1512 can be configured to wirelessly transmit signals having different types or functions, such signals being generated by the processor 1502. Similarly, the receiver 1514 is configured to receive wireless signals having different types or functions, and the processor 1502 is configured to process signals of a plurality of different types.

The device 1500 in this example may serve as Origin 106 in FIG. 1 for map reconstruction based on wireless tracking. For example, the wireless signal generator 1522 may generate and transmit, via the transmitter 1512, a wireless signal through a wireless channel in the venue. The wireless signal carries information of the channel. Because the wireless signal is impacted by a motion of a tracking device moving around the venue, the channel information includes moving information and trajectory from the tracking device. As such, a map reconstruction of the venue can be reconstructed based on the wireless signal. The generation of the wireless signal at the wireless signal generator 1522 may be based on a request for sound sensing from another device, e.g. a Bot, an Origin, or based on a system pre-configuration. That is, the device 1500 may or may not know that the wireless signal transmitted will be used for wireless sound sensing.

The synchronization controller 1506 in this example may be configured to control the operations of the device 1500 to be synchronized or un-synchronized with another device, e.g. a Bot or another Origin. In one embodiment, the synchronization controller 1506 may control the device 1500 to be synchronized with a Bot that receives the wireless signal transmitted by the device 1500. In another embodiment, the synchronization controller 1506 may control the device 1500 to transmit the wireless signal asynchronously with other Bots. In another embodiment, each of the device 1500 and other Bots may transmit the wireless signals individually and asynchronously.

The carrier configurator 1520 is an optional component in device 1500 to configure transmission resources, e.g. time and carrier, for transmitting the wireless signal generated by the wireless signal generator 1522. In one embodiment, each CI of the time series of CI has one or more components each corresponding to a carrier or sub-carrier of the transmission of the wireless signal. The wireless sound sensing may be based on any one or any combination of the components.

The power module 1508 can include a power source such as one or more batteries, and a power regulator, to provide regulated power to each of the above-described modules in FIG. 15. In some embodiments, if the device 1500 is coupled to a dedicated external power source (e.g., a wall electrical outlet), the power module 1508 can include a transformer and a power regulator.

The various modules discussed above are coupled together by a bus system 1530. The bus system 1530 can include a data bus and, for example, a power bus, a control signal bus, and/or a status signal bus in addition to the data bus. It is understood that the modules of the device 1500 can be operatively coupled to one another using any suitable techniques and mediums.

Although a number of separate modules or components are illustrated in FIG. 15, persons of ordinary skill in the art will understand that one or more of the modules can be combined or commonly implemented. For example, the processor 1502 can implement not only the functionality described above with respect to the processor 1502, but also implement the functionality described above with respect to the wireless signal generator 1522. Conversely, each of the modules illustrated in FIG. 15 can be implemented using a plurality of separate components or elements.

Figure 16:
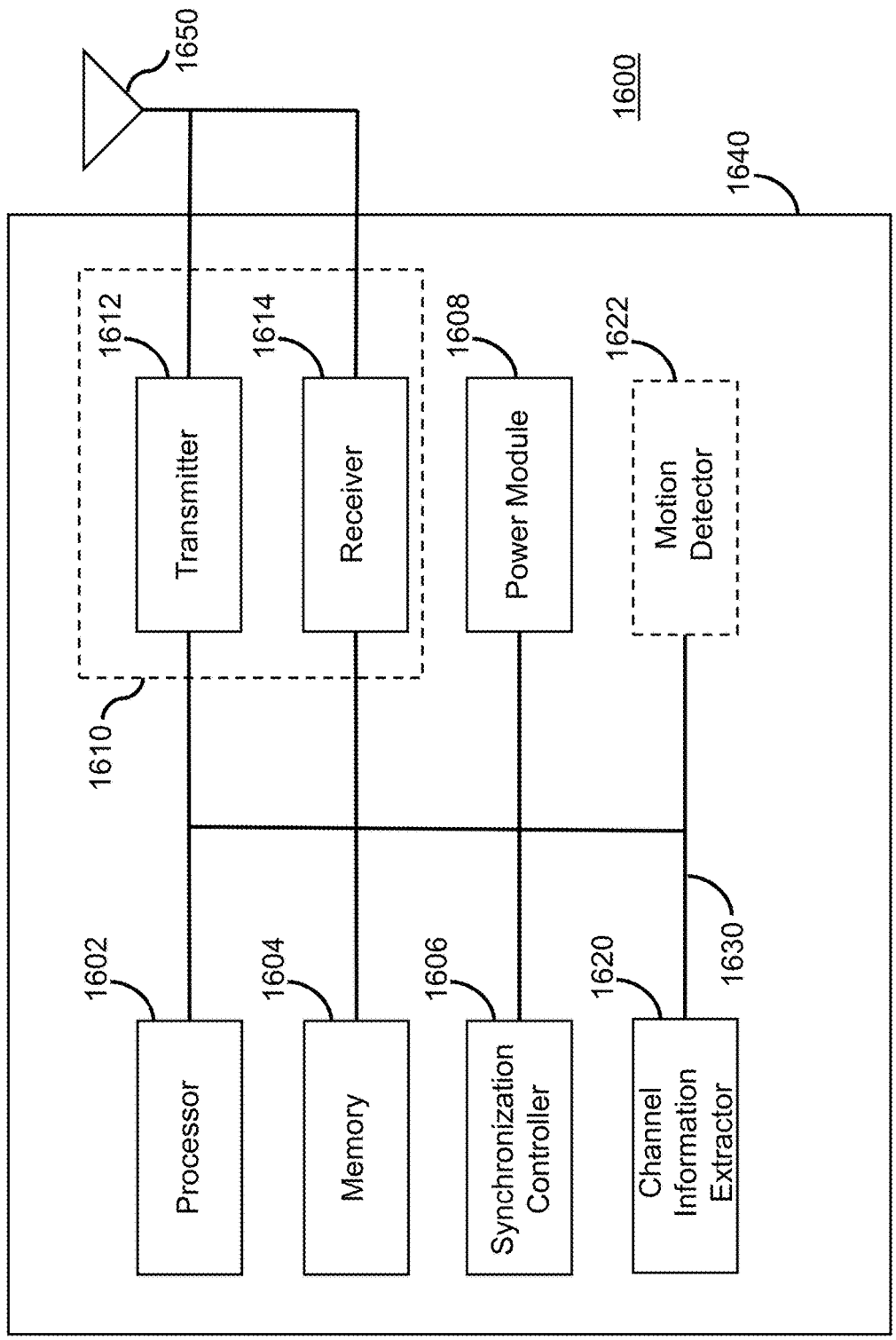
FIG. 16 illustrates an exemplary block diagram of a second wireless device of a system for map reconstruction, according to some embodiments of the present disclosure.

FIG. 16 illustrates an exemplary block diagram of a second wireless device 1600, e.g. a Bot/receiver of a system for map reconstruction based on wireless tracking, according to one embodiment of the present teaching. The device 1600 is an example of a device that can be configured to implement the various methods described herein. The device 1600 in this example may serve as a Bot 105 in FIG. 1 for map reconstruction based on wireless tracking. As shown in FIG. 16, the device 1600 includes a housing 1640 containing a processor 1602, a memory 1604, a transceiver 1610 comprising a transmitter 1612 and a receiver 1614, a power module 1608, a synchronization controller 1606, a channel information extractor 1620, and an optional motion detector 1622.

In this embodiment, the processor 1602, the memory 1604, the transceiver 1610 and the power module 1608 work similarly to the processor 1502, the memory 1504, the transceiver 1510 and the power module 1508 in the device 1500. An antenna 1650 or a multi-antenna array 1650 is typically attached to the housing 1640 and electrically coupled to the transceiver 1610.

The device 1600 may be a second wireless device that has a different type from that of the first wireless device (e.g. the device 1500). In particular, the channel information extractor 1620 in the device 1600 is configured for receiving the wireless signal through the wireless channel, and obtaining a time series of channel information (CI) of the wireless channel based on the wireless signal. The channel information extractor 1620 may send the extracted CI to the optional motion detector 1622 or to a motion detector outside the device 1600 for wireless sound sensing in the venue.

The motion detector 1622 is an optional component in the device 1600. In one embodiment, it is within the device 1600 as shown in FIG. 16. In another embodiment, it is outside the device 1600 and in another device, which may be an Origin or another Bot, a cloud server, a fog server, a local server, and an edge server. The optional motion detector 1622 may be configured for detecting sound information from a vibrating object or source in the venue based on motion information. The motion information may be computed based on the time series of CI by the motion detector 1622 or another motion detector outside the device 1600.

The synchronization controller 1606 in this example may be configured to control the operations of the device 1600 to be synchronized or un-synchronized with another device, e.g. an Origin or another Bot, or an independent motion detector. In one embodiment, the synchronization controller 1606 may control the device 1600 to be synchronized with an Origin that transmits a wireless signal. In another embodiment, the synchronization controller 1606 may control the device 1600 to receive the wireless signal asynchronously with other Bots. In another embodiment, each of the device 1600 and other Bots may receive the wireless signals individually and asynchronously. In one embodiment, the optional motion detector 1622 or a motion detector outside the device 1600 is configured for asynchronously computing respective heterogeneous motion information based on the respective time series of CI.

The various modules discussed above are coupled together by a bus system 1630. The bus system 1630 can include a data bus and, for example, a power bus, a control signal bus, and/or a status signal bus in addition to the data bus. It is understood that the modules of the device 1600 can be operatively coupled to one another using any suitable techniques and mediums.

Although a number of separate modules or components are illustrated in FIG. 16, persons of ordinary skill in the art will understand that one or more of the modules can be combined or commonly implemented. For example, the processor 1602 can implement not only the functionality described above with respect to the processor 1602, but also implement the functionality described above with respect to the channel information extractor 1620. Conversely, each of the modules illustrated in FIG. 16 can be implemented using a plurality of separate components or elements.

In some embodiments, a 2D (or 3D) map is generated based on a number (e.g. 100, 1000 or more) of 2D (or 3D) trajectories, each together with supplementary sensor information (e.g. RSSI, magnetic field strength/MFS). Each trajectory represents a path of a movement of an object in a venue (e.g. building, home, warehouse, parking lot, etc.). An example of 3D trajectory may be a path of a person as he walks up and down multiple floors of a building/facility.

Some 2D/3D trajectories may be collected using channel information (e.g. CSI, CIR, CFR) captured from received wireless signal (e.g. WiFi, 4G/5G/6G/7G, etc.). They may also be collected by other means such as radar, sensors, sensors in smart phones, navigation systems, etc. They may be crowd sourced.

The 2D/3D map to be generated may include the all reachable areas in the venue. For example, a wide hallway should appear thicker. A narrow hallway should appear thinner. A portion of a hallway obstructed by obstacles (and thus not reachable) should not appear in the 2D/3D map. An accessible room should typically appear roughly as a rectangle, but without the internal space obstructed by obstacles (e.g. wall fixtures, sofa, table, cabinets, stove, fridge, lights, fixtures, boxes, etc.).

An exemplary method comprises the following steps.

The first step is trajectory segmentation. Each trajectory is analyzed and segmented/decomposed into atomic segments. Each atomic segment comprises a straight line segment with two turns at both ends.

The second step is segment matching. The atomic segments and the accompanying sensor information are represented in some space such that clustering can be performed to find dense clusters which correspond to "similar" or "matched" atomic segments of the trajectories.

The third step is trajectory bundling. The various trajectories are "aligned" or "bundled" together based on the matched atomic segments.

The fourth step is trajectory fusing and shaping. The bundled/aligned trajectories are fused and shaped to construct the 2D/3D map.

A "distance" may be defined between two segments. The distance may have several components: a difference between their length, a difference between their two turns at both ends, a difference between their RSSI (matched using DTW), a difference between their MFS (matched using DTW). Some trajectories will not be segmented by atomization, e.g. circles, curved pathway, etc.

In some embodiments, a plurality of trajectories may be obtained, where each trajectory may have different starting points (e.g. one trajectory may start in living room while another may start in bedroom), different starting date/day/time, different paths (e.g. one trajectory may go from living room to dining room while another may go from living room to bedroom), different turns (e.g., different pace of movement), different stopping/pausing patterns (e.g. the user may stop in living room for 2 hours before going to dining room while the user may pause in living room for a short time, e.g. 1 min, before going to the bedroom).

Each trajectory may be a series of spatial coordinates which together describes a path in/through the venue. The spatial coordinate may be 2-dimensional, or 3-dimensional, etc. The path may be sampled at a first sampling frequency, e.g. 0.01/0.1/1/10/100/1000 sample per second.

Each trajectory may be captured with a respective device. For example, one trajectory may be captured with an iPhone or Android phone carried by a user, while another may be captured with a tablet device (e.g. iPad). Another may be captured using iRobot. Another may be captured using a device installed in a push cart (e.g. janitor's cart). Another may be captured using wireless signals (e.g. WiFi, 4G/5G/6G/7G/8G, radar signal, etc.) being transmitted from a Type1 device to a Type2 device based on channel information (e.g. CSI, CIR, CFR, RSSI, etc.) derived/captured based on the received wireless signals. The trajectory may be generated using RIM algorithm.

Each trajectory may be accompanied by some sensing data (e.g. RSSI, accelerometer, magnetometer, gyroscope, etc.). Each sensing data (SD) may be sampled at a respective sampling frequency (e.g. RSSI at 100 sample per second, accelerometer at 10 sample per second, magnetometer at 1 sample per second, gyro at 10 sample/sec). The sensing data and the trajectory may share the same time axis (i.e. they are all sampled over time), but their sampling instance (timing) may be different. Thus, time synchronization may be performed to align a trajectory and its accompanying TSSD (e.g. based on time stamps).

Typically in a venue (e.g. a single family house), there may be finite number of possible walkways or path segments. Often a room of "open space" (i.e. empty room, empty hall) may be filled with obstacles (e.g. tables, chairs, tables, desks, shelves, etc.) which restricts the possible walkways or path segments. Thus, typically, same/similar walkways or path segments may appear in different trajectories, at different timing, different order, with different duration, at different paces.

The system may divide each trajectory into a number of segments (segmentation), each with a basically/almost straight path segment and two turns at the two ends of the straight path segment. Then similar segments among the trajectories may be identified/aligned/matched (e.g. based on dynamic time warping applied to accompanying TSSD). A similarity of the trajectories may be analyzed.

Matched segments may need to satisfy some geometric constraint (e.g. length constraint that length difference or length difference percentage must be less than a threshold, or angle constraint that corresponding angle difference must be less than another threshold). For any segment of interest ("current segment"), there may be many candidate segments for matching. A candidate segment may be rejected if it fails to satisfy the geometric constraint. Among the not-rejected candidate segments, the chosen segment (matched segment) for the current segment is the candidate segment with a minimum distance (or matching cost) from the current segment. As the candidate segments and the current segment may have different length/duration with different amount of samples, distance cannot be computed directly. Thus dynamic time warping (DTW) may be applied to align individual samples (of TSSD) such that a normalized distance may be computed (normalized w.r.t. length/amount of samples) between the current segment and each candidate segment.

Then the matched/aligned segments of all the trajectories may be bundled and grouped/joined to form longer segments (e.g. after adjustments/corrections/rotation/translation are applied). Recursively, two adjacent matched segments, or two adjacent "longer joined" segments (e.g. joined segments) each with matched segments, may be combined/grouped/joined to form a longer joined segment, based on some adjustment/correction/rotation/translation so that the matched segments in the two adjacent segments are consistent. The bundling/joining allows individual matched segments to have roughly correct position.

Suppose a segment S1a of a first trajectory T1 is matched to a segment S2a of a second trajectory T2. Suppose further that a segment S1b of T1 is matched to a segment S2b of T2. And S1a and S1b may be neighboring segments in T1 while S2a and S2b may be neighboring segments (e.g. immediately adjacent; or somewhat adjacent, being separated by one or more other segments).

In bundling, S1a and S1b may be combined to form a longer/joined segment, and S2a and S2b may be combined to form a longer/joined segment. Correction/adjustment may be applied to S1a and S1b (e.g. correction to angle in particular) to form a longer, joined segment L1, and also to S2a and S2b to form a longer, joined segment L2, such that L1 is matched to L2. T1 and T2 may be the same trajectory.

Note that although S1a is matched to S2a and S1b is matched to S2b, the unprocessed combined/joined segment of S1a and S1b may NOT match the unprocessed combined/joined segment of S2a and S2b, because the relative angle between S1a and S1b may deviate too much from the relative angle between S2a and S2b. In the bundling process, a turning point between S1a and S1b may be locked/stitched/aligned with a turning point between S2a and S2b. Then S1a and S2a may be adjusted/corrected/rotated/translated/scaled/length adjusted/compensated so that they align. Then segments S1b and S2b may be adjusted/corrected/rotated/translated/scaled/length adjusted/compensated relative to (or w.r.t) S1a and S2a respectively so that the adjusted S1a and S1b would be consistent w.r.t. to the adjusted S2a and S2b.

Suppose a segment S1a of a long-segment L1a of a first trajectory T1 is matched to a segment S2a of a long-segment L2a of a second trajectory T2. Suppose further that a segment S1b of a long-segment L1b of T1 is matched to a segment S2b of a long-segment L2b of T2. And L1a and L1b may be neighboring long-segments in T1 while L2a and L2b may be neighboring long-segments ("neighboring" may mean immediately adjacent/consecutive, or may mean somewhat adjacent, being separated by one or more other segments) in T2. A long-segment may comprise one or more segments (e.g. consecutive segments, or a few "trains" of consecutive segments).

In bundling, L1a and L1b may be combined to form another long-segment L1c, and L2a and L2b may be combined to form yet another long-segment L2c. Correction/adjustment may be applied to L1a and L1b (e.g. correction to angle in particular) to form L1c, and also to L2a and L2b to form L2c, such that L1c is matched to L2c. T1 and T2 may be the same trajectory.

Although S1a may be matched to S2a, unprocessed L1a may not match unprocessed L2a. Thus some kind of processing of L1a and L2a (e.g. correction or adjustment of angles/lengths) may be needed in order for L1a to match L2a. Similarly, although S1b may be matched to S2b, unprocessed L1b may not match unprocessed L2b. Thus some kind of processing of L1b and L2b (e.g. correction or adjustment of angles/lengths) may be needed in order for L1b to match L2b. Furthermore, unprocessed L1c (combined L1a and L1b) may not match the unprocessed L2c (combined L2a and L2b), because a relative angle between L1a and L1b may deviate too much from a relative angle between L2a and L2b.

In the bundling process, a turning point between L1a and L1b may be locked/stitched/aligned with a turning point between L2a and L2b. Then L1a and L2a may be adjusted/corrected/rotated/length adjusted/compensated so that they align. Then long-segments L1b and L2b may be adjusted/corrected/rotated/length adjusted/compensated relative to (or w.r.t) long-segments L1a and L2a respectively so that the adjusted L1c would be consistent w.r.t. to the adjusted L2c.

In one example, the long-segments L1a, L1b, L2a and L2b may each be treated as a rigid body such that there may be no "internal" processing/adjustment of segments in each of the four long-segments. But a relative angle between L1a and L1b, and a relative angle between L2a and L2b may be processed/adjusted.

Then matched segments/trajectories may be fused. For a set of matched segments (associated with a path segment), inner-cluster or intra-cluster constraints may be applied to adjust the segment endpoints towards some "cluster centers".

Fine adjustment to individual segments. Consider the coordinate of end points of a group of matched segments. Within the group, there may be zero, one or more than one matched segments from each trajectory. Even though the segments may be matched and somewhat adjusted in the previous bundling step, the segments may not be perfectly aligned (i.e. may not coincide). In particular, instead of coinciding, the endpoints may be close to each other, forming a cluster. Clustering may be applied to find a "center" of the cluster. Then each of the endpoints may be adjusted to move towards/closer to the cluster center. For example, each endpoint may be replaced by a weighted average of the endpoint and the cluster center. When an endpoint of a segment is adjusted, its length is also changed accordingly.

In the fusion of matched segments/trajectories, inter-cluster constraints may be applied to capture/identify/find missed (or mistakenly separated) turns/endpoints. Occasionally some turns that should be matched may be mistakenly separated (i.e. not matched). A turn is a first endpoint of a first segment (e.g. first bundled segment) coinciding with a second endpoint of a second segment (e.g. second bundled segment) adjacent to the first segment. In the bundling stage, the first segment should have been combined/joined with the second segment. But sometimes, they are not combined/joined. To determine if the first endpoint should be matched to the second endpoint, DTW (of TSSD) may be applied to a first section of the first segment near the first endpoint and a second section of the second segment near the second endpoint. For example, the first section may comprise a first percentage (e.g. 50%, 40%, 30%, 20%, 10%, etc.) of the first segment near the first endpoint. Similarly, the second section may comprise a second percentage (e.g. 50%, 40%, 30%, 20%, 10%, etc.) of the second segment near the second endpoint. DTW may be applied to find an optimal matching score (or distance) the first and second sections of one trajectory with the first and second sections of another trajectory. If the optimal matching score is smaller than a threshold, the first endpoint may be matched to the second endpoint.

With updated endpoint locations (e.g. coordinates), each segment may be transformed/adjusted with a transformation (e.g. Helmert transformation, similarity transformation, datum transformation, 2D transformation, 3D transformation, translation, rotation, scaling). Each point of the segment may be transformed/adjusted with the transformation.

Then area shaping may be applied to generate an area/volume based on the trajectories. When segmenting long trajectories, there may be some curved segments without straight path section. Such curved segments may contain useful information about rooms, curved corridors and open space. The position of the curved segments may be deduced from its spatial relationship with straight segments. Then each point on the curved segment may be transformed/adjusted with the transformation (e.g. Helmert transformation). The curved segments may be grouped with straight segments to reconstruct curve corridors, rooms and open spaces. Area shaping may use a procedure comprising at least one of: alpha-shape, alpha complexes/subcomplexes of Delaunay triangulation, convex hull, minimal spanning tree, morphologic operation, or morphological dilation to expand each point on the segments/trajectories to an area/volume.

While a trajectory may be a 1-dimensional line with no width, the map generated by the map generation system may be a 2D area or 3D volume.

The following numbered clauses provide examples for map generation.

Clause 1. A method/device/system/software of a map generation system, comprising: obtaining a plurality of trajectories each with accompanying sensing data in a venue, wherein each trajectory is a time series of spatial coordinates (TSSC) representing a path traversed by a respective object in the venue, wherein each trajectory is accompanied by at least one respective time series of sensing data (TSSD) collected while the respective object traverses the path in the venue; segmenting each TSSC and its accompanying at least one TSSD; computing similarity between pairs of segments based on the accompanying TSSD; bundling the plurality of trajectories based on the computed similarity; fusing the bundled trajectories; computing a shape of the fused trajectories; generating a map of the venue based on the computed shape.

Clause 2. The method/device/system/software of the map generation system of clause 1, comprising: wherein the at least one respective TSSD comprises at least one of: a time series of smart phone sensor data, a time series of portable device sensor data, a time series of accelerometer data, a time series of gyroscope data, a time series of magnetometer data, a time series of Hall sensor data, a time series of global positioning system (GPS) data, a time series of proximity sensor data, a time series of ambient light sensor data, a time series of photometer data, a time series of pedometer data, a time series of barometer data, a time series of thermometer data, a time series of air humidity sensor data, a time series of Geiger counter data, a time series of Soli sensor data, a time series of gravity sensor data, a time series of harmful radiation sensor data, a time series of microphone data, a time series of touchscreen sensor data, a time series of heart rate monitor data, a time series of near field communication (NFC) sensor data, a time series of Bluetooth data, a time series of RFID data, a time series of LiDAR sensor data, a time series of barcode/QR code sensor data, a time series of wireless signal strength, a time series of global positioning data, a time series of magnetic field strength (MFS), or a time series of received signal strength indicator (RSSI).

TSSC and TSSC may be sampled based on the same time axis, and thus may be time synchronized.

Clause 3. The method/device/system/software of the map generation system of clause 1, comprising: wherein each trajectory is time synchronized with the at least one respective TSSD accompanying the trajectory.

The sampling frequency/period/timing of TSSC and TSSD may be different. The TSSC and/or TSSD may be interpolated so that some or all SD and SC samples may be time aligned.

Clause 4. The method/device/system/software of the map generation system of clause 1, comprising: wherein a point of a particular trajectory is associated with a time stamp; computing an interpolated sensing data (SD) at the time stamp to time align with the point based on an interpolation of a particular TSSD accompanying the particular trajectory.

Segmentation may be applied to the TSSC of each trajectory to identify TSSC segments each associated with a straight line segment and two turns. Based on the segmentation of TSSC, the accompanying TSSD may be segmented based on the corresponding time stamp (as TSSC and TSSD may be time synchronized).

Clause 5. The method/device/system/software of the map generation system of clause 1, comprising: segmenting the TSSC of each trajectory into a set of TSSC segments, wherein each TSSC segment comprises a straight line segment and two turns at the two ends of the straight line segment; segmenting each TSSD accompanying the trajectory into a set of TSSD segments based on the set of TSSC segments, such that each respective TSSD segment is time synchronized with a respective TSSC segment.

To perform TSSC segmentation, straight line segment may be detected. Or, turns may be detected.

Clause 6. The method/device/system/software of the map generation system of clause 5, comprising: detecting at least one of: a straight line segment or a turn in the TSSC of the trajectory; segmenting a TSSC segment of the TSSC based on at least one of: the detected straight line segment, or the detected turn.

Turns may be detected by analyzing/detecting changes of angle/direction provided by TSSD (e.g. accelerometer and/or gyroscope data).

Clause 7. The method/device/system/software of the map generation system of clause 6, comprising: detecting the turn in the TSSC based on at least one TSSD accompanying the trajectory.

A turn may be detected if the rate of change of angle/direction exceeds a threshold.

Clause 8. The method/device/system/software of the map generation system of clause 7, comprising: computing a rate of a change of an angle of the at least one TSSD; detecting the turn in the TSSC based on the rate of the change of the angle.

Individual segments of the trajectories may be matched (by computing/maximizing similarity measure). To compute similarity measure, dynamic time warping is needed to map samples of two segments of different lengths. The similarity measure may be normalized w.r.t. length, sampling frequency, duration.

Clause 9. The method/device/system/software of the map generation system of clause 5, comprising: computing a similarity measure between a first TSSD segment of a first TSSD accompanying a first trajectory and a second TSSD segment of a second TSSD accompanying a second trajectory; matching a first TSSC segment of a first TSSC of the first trajectory with a second TSSC segment of a second TSSC of the second trajectory based on the similarity measure.

Mapping individual sample. Similarity measure may be an aggregation (normalized) of sample-level distance.

Clause 10. The method/device/system/software of the map generation system of clause 9, comprising: mapping each sensing data (SD) in the first TSSD segment to at least one SD in the second TSSD segment; computing the similarity measure between the first TSSD segment and the second TSSD segment based on a distance between the SD in the first TSSD segment and each of its mapped SD in the second TSSD segment.

DTW may be used to do the mapping.

Clause 11. The method/device/system/software of the map generation system of clause 10, comprising: mapping the SD in the two TSSD segment by performing dynamic time warping (DTW).

Similarity measure may be normalized.

Clause 12. The method/device/system/software of the map generation system of clause 9, comprising: wherein the similarity measure is normalized with respect to at least one of: a length of a TSSD segment, a length of a TSSC segment, a count of SD in the TSSD segment, a count of SC in the TSSC segment, a sampling timing of the TSSD segment, a sampling timing of the TSSC segment, a sampling frequency of the TSSD segment, or a sampling frequency of the TSSC segment.

For each TSSC segment, a set of candidate TSSC segments are identified. Candidate TSSC segment may be rejected if the length difference exceeds a threshold, or if the angle difference exceeds another threshold. Similarity measure may be computed only for non-rejected candidate TSSC segments.

Clause 13. The method/device/system/software of the map generation system of clause 9, comprising: wherein each TSSC segment is associated with a length associated with the respective straight line segment and two turning angles associated with the two respective turns; for the first TSSC segment: determining a plurality of candidate TSSC segments, computing a first angle differentiation between a first turning angle of the first TSSC and the first turning angle of each candidate TSSC segment, computing a second angle differentiation between a second turning angle of the first TSSC and the second turning angle of each candidate TSSC segment, rejecting any candidate TSSC segment if the first angle differentiation is larger than a first threshold, or the second angle differentiation is larger than a second threshold, or an aggregate of the first angle differentiation and the second angle differentiation is larger than a third threshold, computing a length differentiation between the length of the first TSSC and the length of each candidate TSSC segment, and rejecting any candidate TSSC segment with a length differentiation larger than a fourth threshold, wherein any differentiation comprises at least one of: a difference, a percentage difference, a ratio, a fraction, a percentage fraction or a combination of the above, wherein the aggregate comprises at least one of: a sum, a linear combination, an average, a weighted average, a geometric mean, or a harmonic mean; wherein the second TSSC segment is a candidate TSSC segment that is not rejected.

Some TSSC segments may be in opposite directions. Thus some additional angle matching is needed to account for the opposite directions.

Clause 14. The method/device/system/software of the map generation system of clause 13, comprising: for the first TSSC segment: computing a third angle differentiation between the first turning angle of the first TSSC and the second turning angle of each candidate TSSC segment, computing a fourth angle differentiation between the second turning angle of the first TSSC and the first turning angle of each candidate TSSC segment, and rejecting any candidate TSSC segment if both condition (a) and condition (b) are true, wherein condition (a) is that the first angle differentiation is larger than the first threshold or the second angle differentiation is larger than the second threshold or the aggregate of the first and second angle differentiation is larger than the third threshold, wherein condition (b) is that the third angle differentiation is larger than a fifth threshold or the fourth angle differentiation is larger than a sixth threshold or an aggregate of the third and fourth angle differentiation is larger than a seventh threshold.

Bundling of trajectories may be performed after matching of individual segments of the trajectories.

Clause 15. The method/device/system/software of the map generation system of clause 9, comprising: bundling the first trajectory and the second trajectory based on the matched first TSSC segment and the matched second TSSC segment.

Clause 16. The method/device/system/software of the map generation system of clause 15, comprising: bundling the first trajectory and the second trajectory based on the respective straight line segment and two turns, of the matched first TSSC segment and the matched second TSSC segment.

In bundling, global geometric property of trajectories may be adjusted. The geometric property may comprise a global (trajectory-to-trajectory) angle of an entire trajectory.

Clause 17. The method/device/system/software of the map generation system of clause 15, comprising: bundling the first trajectory and the second trajectory by adjusting a geometric property of the first TSSC and the second TSSC.

Clause 18. The method/device/system/software of the map generation system of clause 17, comprising: wherein the geometric property comprises a length, a scale, an angle, an orientation, a bearing, a relative geometric property, a relative length, a relative scale, or a relative angle.

Global geometric property may be adjusted to increase/maximize some global similarity between trajectories.

Clause 19. The method/device/system/software of the map generation system of clause 17, comprising: adjusting the geometric property of the first TSSC and the second TSSC to increase a second similarity measure between the first trajectory (i.e. first TSSC) and the second trajectory.

In bundling: Adjust global geometric property may comprise translation, rotation and scaling of trajectories. A point may be locked/aligned/coincided after translation. Then rotation around the point and scaling.

Clause 20. The method/device/system/software of the map generation system of clause 17, comprising: adjusting the geometric property of two TSSC by: translating the first TSSC and the second TSSC spatially so that a first point of the matched first TSSC segment of the first trajectory coincides spatially with a second point of the matched second TSSC segment of the second trajectory, rotating and scaling the translated first TSSC around the first point and the translated second TSSC around the second point.

The alignment point may be an end point of the straight line segment of the matched TSSC segment.

Clause 21. The method/device/system/software of the map generation system of clause 20, comprising: wherein the first point comprises one of: a center point, a non-end point or one of the two end points, of the straight line segment of the matched first TSSC segment; wherein the second point comprises one of: a center point, a non-end point or one of the two end points, of the straight line segment of the matched second TSSC segment.

The alignment point may be a turning point between two adjacent matched TSSC segments of a TSSC.

Clause 22. The method/device/system/software of the map generation system of clause 20, comprising: wherein the first point is a common end point of the first TSSC segment and a third TSSC segment of the first trajectory; wherein the second point is a common end point of the second TSSC segment and a fourth TSSC segment of the second trajectory; wherein the third TSSC segment is matched to the fourth TSSC segment based on the similarity measure between a third TSSD segment of the first TSSD and a fourth TSSD segment of the second TSSD.

In bundling: Local geometric property between adjacent TSSC segments of a trajectory may be adjusted. Third TSSC segment is adjacent to first TSSC segment in first trajectory. Fourth TSSC segment is adjacent to the second TSSC segment in second trajectory. The second geometric property may comprise a local (segment-to-segment) angle between two adjacent matched segments (TSSC segments).

Clause 23. The method/device/system/software of the map generation system of clause 22, comprising: adjusting a second geometric property between the first TSSC segment and an adjacent third TSSC segment of the first trajectory, and also between of the second TSSC segment and an adjacent fourth TSSC segment of the second trajectory, wherein the third TSSC segment of the first trajectory is matched to the fourth TSSC segment of the second trajectory.

Adjust local geometric property to maximize/increase local similarity measure. Temporary TSSC segments (across two adjacent TSSC segments) may be constructed to capture the local geometric characteristics between the two adjacent TSSC segments. For example, angle between two adjacent straight line segments may be adjusted so that the two adjusted adjacent straight line segments in one trajectory match the two adjusted adjacent straight line segments in another trajectory.

Clause 24. The method/device/system/software of the map generation system of clause 23, comprising: computing a third similarity measure between a first temporary TSSC segment of the first TSSC and a second temporary TSSC segment of the second TSSC, wherein the first temporary TSSC segment comprises a sub-segment of the first TSSC segment and an adjoining sub-segment of the third TSSC segment of the first TSSC, wherein the second temporary TSSC segment comprises a sub-segment of the second TSSC segment and an adjoining sub-segment of the fourth TSSC segment of the second TSSC; adjusting the second geometric property to increase the third similarity measure.

Need to align the SC in the temporary TSSC segments to compute the third similarity measure.

Clause 25. The method/device/system/software of the map generation system of clause 24, comprising: mapping each spatial coordinate (SC) in the first temporary TSSC segment to at least one SC in the second temporary TSSC segment; computing the third similarity measure between the first temporary TSSC segment and the second temporary TSSC segment based on a spatial distance between the SC in the first temporary TSSC segment and each of its mapped SC in the second temporary TSSC segment.

Clause 26. The method/device/system/software of the map generation system of clause 25, comprising: mapping the SC in the two temporary TSSC segments by performing dynamic time warping (DTW).

After bundling the trajectories, the bundled trajectories may be fused. Some adjustment are needed. (1) fine adjustment of locations of the matched end-points of the matched segments (move each end point in a cluster of end points towards the cluster center)—(2) identify some not-matched turning points (end points) that should have been matched. Identity non-temporally adjacent matched segments that are spatially adjacent. (Note: temporally adjacent matched segments should be spatially adjacent. But temporally non-adjacent matched segments can also be spatially adjacent when the user re-visit the path or the turning point a second time in the trajectory. This step is to identify them and to mark them as spatially adjacent.)

Clause 27. The method/device/system/software of the map generation system of clause 17, comprising: fusing the bundled trajectories by adjusting end points of matched TSSC segments of the bundled trajectories and by identifying spatially adjacent matched segments that are not temporally adjacent.

Fine adjustment of locations of the matched end-points of the matched segments (move each end point in a cluster of end points towards the cluster center).

Clause 28. The method/device/system/software of the map generation system of clause 27, comprising: determining a plurality of matched TSSC segments each of a respective trajectory; determining a cluster of matched end points associated the matched TSSC segments; computing a cluster center of the plurality of matched end points; adjusting each matched end points in the cluster towards the cluster center.

Adjust an end point by replacing it by a weighted average of the end point and the cluster center.

Clause 29. The method/device/system/software of the map generation system of clause 28, comprising: replacing each matched end point in the cluster by a weighted average of the matched end point and the cluster center.

Adjust an end point by replacing it by the cluster center.

Clause 30. The method/device/system/software of the map generation system of clause 29, comprising: replacing each matched end point in the cluster by the cluster center.

The rest of the un-adjusted end-points need to be processed accordingly using Helmert transform.

Clause 31. The method/device/system/software of the map generation system of clause 30, comprising: transforming the non-adjusted end points of the trajectories based on a transformation, wherein the transformation comprises at least one of: Helmert transformation, similarity transformation, datum transformation, 2D transformation, 3D transformation, translation, rotation, or scaling.

Identify some not-matched turning points (end points) that should have been matched. Identity non-temporally adjacent matched segments that are spatially adjacent. (Note: temporally adjacent matched segments should be spatially adjacent. But temporally non-adjacent matched segments can also be spatially adjacent when the user re-visit the path or the turning point a second time in the trajectory. This step is to identify them and to mark them as spatially adjacent.)—Temporally non-adjacent segments may be spatially connected based on TSSD matching.

Clause 32. The method/device/system/software of the map generation system of clause 27, comprising: wherein a fifth TSSC segment of the first TSSC and a sixth TSSC segment of the second TSSC are matched; wherein either the fifth TSSC segment is not temporally adjacent to the first TSSC segment in the first TSSC, or the sixth TSSC segment is not temporally adjacent to the second TSSC segment in the second TSSC; constructing a first temporary TSSD segment based on a concatenation of a sub-segment of the first TSSD segment and a sub-segment of a fifth TSSD segment of the first TSSD, wherein the fifth TSSD segment is associated with the fifth TSSC segment; constructing a second temporary TSSD segment based on a concatenation of a sub-segment of the second TSSD segment and a sub-segment of a sixth TSSD segment of the second TSSD, wherein the sixth TSSD segment is associated with the second TSSD segment; computing the similarity measure between the first temporary TSSD segment and the second temporary TSSD segment; computing a spatially adjacent relationship between the first TSSC segment and the temporally non-adjacent fifth TSSC segment in the map; and computing a spatially adjacent relationship between the second TSSC segment and the temporally non-adjacent sixth TSSC segment in the map.

If two temporally non-adjacent segments are spatially adjacent, they should be connected in the map.

Clause 33. The method/device/system/software of the map generation system of clause 31, comprising: spatially connecting the first TSSC segment and the temporally non-adjacent fifth TSSC segment in the map based on their spatially adjacent relationship; and spatially connecting the second TSSC segment and the temporally non-adjacent sixth TSSC segment in the map based on their spatially adjacent relationship.

Similarity measure may be computed based on DTW.

Clause 34. The method/device/system/software of the map generation system of clause 31, comprising: computing the similarity measure between the first temporary TSSD segment and the second temporary TSSD segment based on dynamic time warping (DTW).

Compute shape by expanding each SC on the fused trajectories to give it a width/length, an area or a volume.

Clause 35. The method/device/system/software of the map generation system of clause 27, comprising: computing the shape of the fused trajectories by expanding each point of the fused trajectories to an area or a volume.

Compute shape based on alpha-shaping.

Clause 36. The method/device/system/software of the map generation system of clause 35, comprising: computing the shape of the fused trajectories based on a shaping, wherein the shaping comprises at least one of: alpha shape, alpha complexes or sub-complexes of Delaunay triangulation, convex hull, minimal spanning tree, morphological operation or morphological dilation.

Include curved segments (i.e. not straight line segments).

Clause 37. The method/device/system/software of the map generation system of clause 27, comprising: wherein the fused trajectories comprise curved segments of the trajectories that are not associated with straight line segments.

Curved segments need to be adjusted geometrically.

Clause 38. The method/device/system/software of the map generation system of clause 37, comprising: adjusting a geometric property of the curved segments based on their spatial relationship with the TSSC segments associated with straight line segments, wherein the geometric property comprises at least one of: a position, an angle and a size.

Curved segments need to be adjusted geometrically based on translation, rotation and scaling.

Clause 39. The method/device/system/software of the map generation system of clause 38, comprising: adjusting a position of a curved segment based on translation, adjusting an angle of the curved segment based on rotation, and adjusting a size of the curved segment based on scaling.

In some embodiments, a method is disclosed for sensing based on selectable basic time unit values.

An "availability window" or "sensing availability window" may be a period of time in which two or more wireless stations or STAs are scheduled to do trigger-based (TB) sensing/ranging operations. For example, the STAs may be ISTA (initiator or initiating STA, a kind of sensing initiator) plus one or more RSTA (responder/responding STA, a kind of sensing responder). The STAs may be an AP (sensing initiator in TB sensing in 802.11bf, a kind of ISTA) plus one or more non-AP (sensing responder in TB sensing in 802.11bf, a kind of RSTA). The STAs may be scheduled to perform TB ranging in 802.11az, or TB sensing (e.g. NDPA sounding or TF sounding) in 802.11bf.

For example, an ISTA, RSTA, AP or non-AP may "sleep" or operate in low-power/power-saving mode, and then wake up at the scheduled time in accordance with the availability window to perform the scheduled TB sensing/ranging operations. Or, the ISTA, RSTA, AP or non-AP may first perform another operation(s), and then pause at the scheduled time in accordance with the availability window to perform the scheduled TB sensing/ranging operations.

In a wireless standard (e.g. 802.11az, clause 9.4.2.296 ISTA Availability Window element on P.71-72 of 802.11az D5.0), there may be an ISTA Availability Window element (ISTA may be initiator/initiating STA as in 802.11az or other standards/schemes, or sensing initiator/SBP initiator in802.11bf) which may have 1 octet (8 bits, or a byte) for "Element ID", 1 octet for "Length", 1 octet for "Element ID Extension" and a variable-length (in octets) "ISTA Availability Information". The ISTA Availability Window element may be used also in a wireless sensing standard (e.g. in SBP request frame of 802.11bf).

The ISTA Availability Information field may have a 9-bit sub-field called "Count" to indicate the size in bits of the Availability Bitmap subfield, a 7-bit subfield called "reserved", a variable-length (in bits) subfield called "Availability Bitmap" and a variable-length (in bits) subfield called "Padding". The Count subfield may indicate the size (in bits) of the Availability Bitmap subfield. Each bit (called "Availability Bit") in the Availability Bitmap subfield indicates the ISTA's availability for sensing operation (e.g. TB ranging in 802.11az, or sensing measurement in 802.11bf such as trigger-based (TB) sensing, NDPA-base TB sensing, TF-based TB sensing, non-TB sensing or R2R sensing) with the recipient RSTA (RSTA may be responder/responding STA as in 802.11az or other standards/schemes, or sensing responder in 802.11bf). The value indicated by each bit in the Availability Bit may be in units of a basic time unit (BTU).

Bit $B_k$ (where $0 \leq k \leq count-1$) may represent the ISTA's (e.g. SBP initiator's) periodic availability for the sensing operation (e.g. TB ranging in 11az or TB sensing in 11bf) with the RSTA (e.g. SBP responder) in the interval [$t_{start,k}$, $t_{end,k}$] repeated every N TUs. Each Availability Bit in the Availability Bitmap subfield may indicate the SBP initiator's availability for TB sensing with the recipient SBP responder. The value indicated by each bit in the Availability Bitmap may be in units of BTU (e.g. 10 TUs).

The basic time unit may be a predefined time unit (e.g. 10,000 micro-second, 1000 micro-second, 10 TU or 1 TU, wherein one TU may be 1024 micro-second as in 802.11 or some other pre-defined time value). The BTU may limit the maximum supported sensing frequency. For example, if BTU is 10,000 micro-second, the maximum sounding frequency for sensing may be limited to 100 Hz. If BTU is 10 TU, the maximum sounding frequency for sensing may be approximately 97.7 Hz.

There may be multiple allowable/supported/selectable values for the BTU (e.g. 1/10/20/100/200/1000 micro-seconds, or 0.01/0.1/1/10/100 TU). For example, one allowable BTU may be 10 TU, another may be 1 TU or 0.1 TU. The multiple selectable values for BTU may be optional.

The BTU may be selected/chosen from the set of multiple selectable values. One or more bits of the 7-bit "reserved" subfield, or some other field/field may be used to indicate/select/represent the selected/chosen/requested value for BTU from among the multiple selectable values.

The multiple selectable values may be selected/activated/engaged (e.g. by user, or super-user, or network administrator, or AP, or sensing initiator, or sensing responder, or SBP initiator, or SBP responder). At different time or under different situation, the set of selectable values for BTU may be different. The set of selectable values for BTU may be customized/negotiated/agreed/assigned/initialized/changed/adjusted/updated/terminated.

A bit or a field or subfield may be used to indicate whether there is one selectable value for BTU, or two selectable values, or multiple selectable values or N selectable values. The number N may be indicated in the same field/subfield or in a separate field/subfield.

Different sets of selectable values (with possibly different amount of selectable values) for BTU may be used for different operating conditions/situations. For example, in a first case/situation (e.g. sensing measurement (e.g. CSI) being reported over-the-air), there may be a first (and only one) selectable value for the BTU (e.g. 10 TU). In a second case/situation (e.g. sensing measurement not being reported over-the-air), there may be a second (and only one) selectable, but different value for the BTU (e.g. 1 TU). In a third case/situation, there may multiple selectable values for the BTU (e.g. 1 TU and 10 TU, or 1000/100/10/1/0.1/0.01/0.01/0.001 TU). In some case/situation, the set of selectable values may be customizable (e.g. by user, super-user, network administrator, sensing initiator, sensing responder, SBP initiator, SBP responder, AP). The customization may be performed during sensing session setup. A set of selectable values may comprise 2 values, or 3, 4, 6, 8, 16 or any amount of values.

The "Count" may be different for different selected values of BTU. For example, the Count may be 5000 when BTU=10 TU, and 50000 when BTU=1 TU.

In some embodiments, a system and method are disclosed for non-human recognition, to differentiate motion due to human versus motion due to non-human (e.g. pet, fan, electric appliances, mechanical vibration, or iRobot.) The method may include the following steps.

At step 1, the system may obtain TSCI from wireless signal transmitted by Type1 device and received by Type2 device. Motion may be due to an object (e.g. human, non-human, pet or robot vacuum cleaner).

At step 2, the system may compute an auto-correlation function (ACF) based on the TSCI (e.g. based on a first feature such as magnitude or phase of each CI), and identify a second feature of ACF (e.g. peaks or local max, valleys or local min).

At step 3, the system may compute a number of ACF-based statistics, including ACF peaks mean, ACF valleys mean, ACF peaks interval distance, and ACF valleys interval distance.

The ACF peaks/valleys mean may be computed by computing a number of local max (for ACF peaks mean) or local min (for ACF valleys mean) of ACF for each time instance, computing a "first mean" (e.g. weighted averaging, arithmetic mean, geometric mean, harmonic mean, percentile, median, max, min, mode) of the number of local max/min for the time instance, and then computing a "second mean" (e.g. a "first mean", or filtering, or lowpass filtering) of all the first mean of the time instances in a time window. Alternatively, the ACF peaks/valleys mean may be computed by computing a global max (for ACF peaks mean) or a global min (for ACF valleys mean) of ACF for each time instance, and then computing the "second mean" of all the global max/min of time instances in the time window. This is a special case of (a) in which the "first mean" is max (for ACF peaks mean) or min (for ACF valleys mean).

The ACF peaks/valleys interval distance may be computed by computing the number of local max (for ACF peaks interval distance) or local min (for ACF valleys interval distance) of the ACF for each time instance, computing a number of intervals each being a temporal distance or temporal interval between a pair of neighboring/adjacent local max/min of the ACF for the time instance, computing the "first mean" of the number of intervals for the time instance, and computing the "second mean" (such as weighted averaging, or filtering, or lowpass filtering) of all the first mean of time instances in the time window.

At step 4, the system may compute a motion statistics (MS) based on the ACF (e.g. ACF at a fixed time delay, T1) for each time instance. For example, for T1=1, the MS may be TRRS, inner-product or based on the TSCI. Or, T1=k for TRRS based on TSCI down-sampled at a factor of k. The system can compute some MS-based statistics such as MS mean, and MS variance in a time window.

The motion statistics mean may be computed by computing the "second mean" (such as the first mean, filtering, or lowpass filtering) of all the motion statistics of the time instance in the time window. The motion statistics variance may be computed by computing a "variation measure" (such as variance, standard deviation, variation, derivative, slope, total variation, absolute variation, square variation, spread, dispersion, variability, deviation, absolute deviation, square deviation, total deviation, divergence, range, interquartile range, skewness, kurtosis, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, maximum-to-minimum ratio, variation measure, regularity measure, similarity measure, likelihood, probability distribution function, sample distribution, moment generating function, expected value, expected function) of all the motion statistics of the time instance in the time window.

At step 5, the system may compute a speed of the motion of the object based on ACF of the CSI for a number of time instance. The system may obtain a time series of speed (TSSP). The sampling frequency of TSSP may be lower than that of TSCI. The system can then compute speed-based statistics including a number of gait statistics (e.g. presence of gait, stride cycle time, step cycle time, N-cycle time, stride cycle distance, step cycle distance, N-cycle distance based on the TSSP), and a number of simple speed statistics (e.g. speed mean, speed variation measure, speed percentile, speed histogram).

At step 6, the system may identify peaks (local max), valleys (local min) and/or zero-crossings of the TSSP, and process the peaks, valleys and zero-crossings by removing "false peak", "false valley" and/or "false zero-crossing". False peaks, and false valleys may be removed in pairs (i.e. one false peak may be removed with one adjacent/neighboring false valley together). False zero-crossings may be removed in pairs (i.e. two immediately adjacent zero-crossings may be removed together). The zero-crossings may be computed as zero-crossings of mean-subtracted TSSP.

At step 7, the system may compute a presence of gait behavior of the motion of the object based on the peaks, valleys and/or zero-crossings of the TSSP (or simply the TSSP). For a valid presence of gait behavior, a count of the peaks, valleys or zero-crossings may be upper bounded (by a first threshold) and/or lowered bounded (by a second threshold).

At step 8, if gait behavior is detected (i.e. if gait is present), the system may compute gait statistics (e.g. stride cycle time, step cycle time, stride length, step length). This may include the following sub-steps.

At sub-step 8a, the system can compute a number of "intervals", each being a temporal distance or temporal interval between a pair of neighboring/adjacent peaks or valley or zero-crossing.

At sub-step 8b, the system can compute a number of "interval distance" based on the TSSP corresponding to the number of "intervals", each "interval distance" being the distance traversed by the object in a corresponding interval. An interval distance may be computed as a product of the corresponding interval and a "representative speed" (e.g. "first mean" or "second mean" of speed) in the interval. Alternatively, the interval may be subdivided into more than one disjoint sub-intervals. A subinterval distance may be computed as a product of a sub-interval and a "representative speed" in the sub-interval. The interval distance may be computed as the "first mean" or "second mean" of the more than one corresponding subinterval distance.

At sub-step 8c, the system can compute the stride cycle time as a first "second mean" of the intervals between pairs of immediately adjacent peaks, or a second "second mean" of the intervals between pairs of immediately adjacent valleys, or a third "second mean" of the intervals between pairs of every other zero-crossing (i.e. between first and third zero-crossing, or between $k^{th}$ and $(k+2)^{th}$ zero-crossing) or a weighted average of the first "second mean", the second "second mean" and/or the third "second mean".

At sub-step 8d, the system can compute the step cycle time as half of the stride cycle time. Alternatively, the step cycle time may be computed based on a fourth "second mean" of the intervals between pairs of immediately adjacent zero-crossing (i.e. between first and second zero-crossing, or between $k^{th}$ and $(k+1)^{th}$ zero-crossing).

At sub-step 8e, an N-cycle time may be computed as the interval spanned by N peaks, or N valleys, or 2N zero-crossings.

At sub-step 8f, the system can compute the step cycle distance, stride cycle distance and/or N-cycle distance based on the interval distance. The step cycle distance, stride cycle distance or N-cycle distance may be defined as the distance traversed by the object motion in a step cycle time, a stride cycle time or a N-cycle time. The step cycle distance, stride cycle distance or N-cycle distance may be computed based on a summation of interval distance associated with all intervals in the corresponding step cycle time, stride cycle time or N-cycle time. The step cycle distance, stride cycle distance or N-cycle distance may be averaged over a time period using the first mean or second mean.

At step 9, the system can compute some simple speed statistics (e.g. second mean of speed as defined above, "variation measure" of speed as defined above, speed 25 percentile, speed 50 percentile/median speed, speed 75 percentile) over a time period. A histogram of the speed in the time period may be computed. Any speed percentile or variation measure may be computed based on the histogram.

At step 10, the system can perform a monitoring task based on the ACF-based statistics, the MS-based statistics, the speed-based statistics (including both gait statistics and the simple speed statistics). The monitoring task comprises at least one of: classification/detection/recognition/identification/presence/absence/appearance/disappearance/ADL (activity daily living) of at least two of: human, human adult, older human, human children, human baby, non-human, non-human pet, non-human robot, non-human machinery. The task may comprise gesture recognition, tracking, localization, locationing, navigation. The task may be performed based on machine learning, classifier, supervised learning, unsupervised learning, semi-supervised learning, clustering, feature extraction, featuring training, principal component analysis, eigen-decomposition, frequency decomposition, time decomposition, time-frequency decomposition, training, discriminative training, supervised training, unsupervised training, semi-supervised training, neural network, deep learning.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for map generation, comprising:
a sensor configured to collect sensing data in a venue and obtain a plurality of trajectories, wherein:
 each trajectory is a time series of spatial coordinates (TSSC) representing a path traversed by a respective object in the venue,
 each TSSC is accompanied by at least one respective time series of sensing data (TSSD) collected while the respective object traverses the path in the venue, wherein the TSSC is time synchronized with the at least one respective TSSD; and
a processor configured for:
 segmenting each TSSC of each trajectory into a set of TSSC segments, each TSSC segment comprising a straight line segment and two turns at two ends of the straight line segment,
 segmenting each TSSD accompanying the trajectory into a respective set of TSSD segments based on the set of TSSC segments of the accompanying TSSC, each TSSD segment being time synchronized with a corresponding TSSC segment of the accompanying TSSC,
 matching a first TSSC segment of a first TSSC of a first trajectory with a second TSSC segment of a second TSSC of a second trajectory to generate a matched first TSSC segment and a matched second TSSC segment, wherein matching the first TSSC segment comprises:
  determining a plurality of candidate TSSC segments among the plurality of trajectories for the first TSSC segment of the first trajectory,
  computing a respective first angle differentiation between a first turning angle of the first TSSC segment and a respective first turning angle of each candidate TSSC segment,
  computing a respective second angle differentiation between a second turning angle of the first TSSC segment and a respective second turning angle of each candidate TSSC segment,
  computing a respective third angle differentiation between the first turning angle of the first TSSC segment and the respective second turning angle of each candidate TSSC segment,
  computing a respective fourth angle differentiation between the second turning angle of the first TSSC segment and the respective first turning angle of each candidate TSSC segment,
  rejecting any candidate TSSC segment when both a condition (1) and a condition (2) are true,
  wherein the condition (1) is true when any of the following is true: (a) the respective first angle differentiation associated with the candidate TSSC segment is larger than a first threshold, (b) the respective second angle differentiation associated with the candidate TSSC segment is larger than a second threshold, or (c) an aggregate of the respective first angle differentiation and the respective second angle differentiation is larger than a third threshold, wherein the condition (2) is true when any of the following is true: (d) the respective third angle differentiation associated with the candidate TSSC segment is larger than a fifth threshold, (e) the respective fourth angle differentiation associated with the candidate TSSC segment is larger than a sixth threshold, or (f) an aggregate of the respective third angle differentiation and the respective fourth angle differentiation is larger than a seventh threshold, computing a respective length differentiation between a length of the first TSSC segment and a respective length of each candidate TSSC segment, rejecting any candidate TSSC segment when (d) the respective length differentiation is larger than a fourth threshold, computing a respective similarity measure between a first TSSD segment, of a first TSSD accompanying the first TSSC, associated with the first TSSC segment and a respective TSSD segment associated with each candidate TSSC segment, wherein the second TSSC segment is one of the candidate TSSC segments that is not rejected, and matching the first TSSC segment of the first TSSC with the second TSSC segment of the second TSSC based on the respective similarity measure between the first TSSD segment and a second TSSD segment associated with the second TSSC segment, bundling the plurality of trajectories based on similarity measures between pairs of the TSSC segments, fusing the bundled trajectories to generate fused trajectories, computing a shape of the fused trajectories, and generating a map of the venue based on the computed shape.

2. The system of claim 1, wherein:
the at least one respective TSSD comprises at least one of:
  a time series of smart phone sensor data,
  a time series of portable device sensor data,
  a time series of accelerometer data,
  a time series of gyroscope data,
  a time series of magnetometer data,
  a time series of wireless signal strength,
  a time series of global positioning data,
  a time series of magnetic field strength (MFS), or
  a time series of received signal strength indicator (RSSI).

3. The system of claim 1, wherein segmenting the TSSC of each trajectory comprises:
  detecting a straight line segment and a turn in the TSSC of the trajectory, wherein the turn in the TSSC is detected based on a rate of a change of an angle of the at least one TSSD accompanying the trajectory; and
  segmenting the TSSC to generate a TSSC segment of the TSSC based on at least one of: the detected straight line segment, or the detected turn.

4. The system of claim 3, wherein the processor is further configured for:

mapping each sensing data (SD) in the first TSSD segment to at least one SD in the second TSSD segment based on dynamic time warping (DTW); and computing the similarity measure between the first TSSD segment and the second TSSD segment based on a distance between each SD in the first TSSD segment and each of its mapped SD in the second TSSD segment.

5. The system of claim 4, wherein:
the similarity measure is normalized with respect to at least one of: a length of a TSSD segment, a length of a TSSC segment, a count of SD in the TSSD segment, a count of SC in the TSSC segment, a sampling timing of the TSSD segment, a sampling timing of the TSSC segment, a sampling frequency of the TSSD segment, or a sampling frequency of the TSSC segment; and each TSSC segment is associated with a length associated with the respective straight line segment and two turning angles associated with the two respective turns.

6. The system of claim 5, wherein the processor is further configured for:
  bundling the first trajectory and the second trajectory based on the respective straight line segment and the respective two turns of the matched first TSSC segment and the matched second TSSC segment,
  wherein the first trajectory and the second trajectory are bundling by adjusting a geometric property of the first TSSC and the second TSSC, to increase a second similarity measure between the first trajectory and the second trajectory.

7. The system of claim 6, wherein adjusting the geometric property of the first TSSC and the second TSSC comprises:
  translating the first TSSC and the second TSSC spatially such that a first point of the matched first TSSC segment of the first trajectory coincides spatially with a second point of the matched second TSSC segment of the second trajectory;
  rotating and scaling the translated first TSSC around the first point; and
  rotating and scaling the translated second TSSC around the second point.

8. The system of claim 7, wherein:
  the first point is a common end point of the first TSSC segment and a third TSSC segment of the first trajectory;
  the second point is a common end point of the second TSSC segment and a fourth TSSC segment of the second trajectory; and
  the third TSSC segment is matched to the fourth TSSC segment based on a similarity measure between a third TSSD segment of the first TSSD and a fourth TSSD segment of the second TSSD.

9. The system of claim 8, wherein the processor is further configured for:
  adjusting a first geometric property between the first TSSC segment and the third TSSC segment of the first trajectory; and
  adjusting a second geometric property between the second TSSC segment and the fourth TSSC segment of the second trajectory.

10. The system of claim 9, wherein the processor is further configured for:
  computing a third similarity measure between a first temporary TSSC segment of the first TSSC and a second temporary TSSC segment of the second TSSC, wherein the first temporary TSSC segment comprises a sub-segment of the first TSSC segment and an adjoining sub-segment of the third TSSC segment of the first TSSC, the second temporary TSSC segment comprises a sub-segment of the second TSSC segment and an adjoining sub-segment of the fourth TSSC segment of the second TSSC, and the first geometric property and the second geometric property are adjusted to increase the third similarity measure.

11. The system of claim 10, wherein computing the third similarity measure comprises:

mapping each spatial coordinate (SC) in the first temporary TSSC segment to at least one SC in the second temporary TSSC segment based on dynamic time warping (DTW); and computing the third similarity measure between the first temporary TSSC segment and the second temporary TSSC segment based on a spatial distance between each SC in the first temporary TSSC segment and each of its mapped SC in the second temporary TSSC segment.

12. The system of claim 11, wherein the processor is further configured for fusing the bundled trajectories based on:

adjusting end points of matched TSSC segments of the bundled trajectories;

identifying spatially adjacent matched segments that are not temporally adjacent.

13. The system of claim 12, wherein adjusting the end points comprises:

determining a plurality of matched TSSC segments each from a respective trajectory;

determining a cluster of matched end points associated the plurality of matched TSSC segments;

computing a cluster center of the cluster of matched end points; and adjusting each matched end point in the cluster towards the cluster center.

14. The system of claim 13, wherein adjusting the end points further comprises at least one of:

replacing each matched end point in the cluster by a weighted average of the matched end point and the cluster center; or replacing each matched end point in the cluster by the cluster center.

15. The system of claim 14, wherein:

a fifth TSSC segment of the first TSSC and a sixth TSSC segment of the second TSSC are matched; and either the fifth TSSC segment is not temporally adjacent to the first TSSC segment in the first TSSC, or the sixth TSSC segment is not temporally adjacent to the second TSSC segment in the second TSSC.

16. The system of claim 15, wherein the processor is further configured for:

constructing a first temporary TSSD segment based on a concatenation of a sub-segment of the first TSSD segment and a sub-segment of a fifth TSSD segment of the first TSSD, wherein the fifth TSSD segment is associated with the fifth TSSC segment;

constructing a second temporary TSSD segment based on a concatenation of a sub-segment of the second TSSD segment and a sub-segment of a sixth TSSD segment of the second TSSD, wherein the sixth TSSD segment is associated with the sixth TSSC segment;

computing a similarity measure between the first temporary TSSD segment and the second temporary TSSD segment;

computing a first adjacent relationship between the first TSSC segment and the temporally non-adjacent fifth TSSC segment in the map; and computing a second adjacent relationship between the second TSSC segment and the temporally non-adjacent sixth TSSC segment in the map.

17. The system of claim 16, wherein the processor is further configured for:

spatially connecting the first TSSC segment and the temporally non-adjacent fifth TSSC segment in the map based on the first spatially adjacent relationship; and spatially connecting the second TSSC segment and the temporally non-adjacent sixth TSSC segment in the map based on the second spatially adjacent relationship.

18. The system of claim 17, wherein the processor is further configured for:

computing the shape of the fused trajectories by expanding each point of the fused trajectories to an area or a volume, wherein the fused trajectories comprise curved segments of the plurality of trajectories that are not associated with straight line segments; and adjusting a geometric property of the curved segments based on their spatial relationships with the TSSC segments associated with straight line segments.

19. The system of claim 18, wherein adjusting a geometric property of a curved segment comprises at least one of:

adjusting a position of the curved segment based on translation;

adjusting an angle of the curved segment based on rotation; and adjusting a size of the curved segment based on scaling.

20. An apparatus for map generation, comprising:

a sensor configured to collect sensing data in a venue and obtain a plurality of trajectories, wherein:

each trajectory is a time series of spatial coordinates (TSSC) representing a path traversed by a respective object in the venue, each TSSC is accompanied by at least one respective time series of sensing data (TSSD) collected while the respective object traverses the path in the venue, wherein the TSSC is time synchronized with the at least one respective TSSD; and a processor communicatively coupled to the sensor and configured for:

segmenting each TSSC of each trajectory into a set of TSSC segments, each TSSC segment comprising a straight line segment and two turns at two ends of the straight line segment, segmenting each TSSD accompanying the trajectory into a respective set of TSSD segments based on the set of TSSC segments of the accompanying TSSC, each TSSD segment being time synchronized with a corresponding TSSC segment of the accompanying TSSC, matching a first TSSC segment of a first TSSC of a first trajectory with a second TSSC segment of a second TSSC of a second trajectory to generate a matched first TSSC segment and a matched second TSSC segment, wherein matching the first TSSC segment comprises:

determining a plurality of candidate TSSC segments among the plurality of trajectories for the first TSSC segment of the first trajectory, computing a respective first angle differentiation between a first turning angle of the first TSSC segment and a respective first turning angle of each candidate TSSC segment,
computing a respective second angle differentiation between a second turning angle of the first TSSC segment and a respective second turning angle of each candidate TSSC segment,
computing a respective third angle differentiation between the first turning angle of the first TSSC segment and the respective second turning angle of each candidate TSSC segment,
computing a respective fourth angle differentiation between the second turning angle of the first TSSC segment and the respective first turning angle of each candidate TSSC segment,
rejecting any candidate TSSC segment when both a condition (1) and a condition (2) are true,
wherein the condition (1) is true when any of the following is true: (a) the respective first angle differentiation associated with the candidate TSSC segment is larger than a first threshold, (b) the respective second angle differentiation associated with the candidate TSSC segment is larger than a second threshold, or (c) an aggregate of the respective first angle differentiation and the respective second angle differentiation is larger than a third threshold,
wherein the condition (2) is true when any of the following is true: (d) the respective third angle differentiation associated with the candidate TSSC segment is larger than a fifth threshold, (e) the respective fourth angle differentiation associated with the candidate TSSC segment is larger than a sixth threshold, or (f) an aggregate of the respective third angle differentiation and the respective fourth angle differentiation is larger than a seventh threshold,
computing a respective length differentiation between a length of the first TSSC segment and a respective length of each candidate TSSC segment,
rejecting any candidate TSSC segment when (d) the respective length differentiation is larger than a fourth threshold,
computing a respective similarity measure between a first TSSD segment, of a first TSSD accompanying the first TSSC, associated with the first TSSC segment and a respective TSSD segment associated with each candidate TSSC segment, wherein the second TSSC segment is one of the candidate TSSC segments that is not rejected, and
matching the first TSSC segment of the first TSSC with the second TSSC segment of the second TSSC based on the respective similarity measure between the first TSSD segment and a second TSSD segment associated with the second TSSC segment,
bundling the plurality of trajectories based on similarity measures between pairs of the TSSC segments,
fusing the bundled trajectories to generate fused trajectories,
computing a shape of the fused trajectories, and
generating a map of the venue based on the computed shape.

21. A method for map generation, comprising:
obtaining sensing data and a plurality of trajectories in a venue, wherein:
each trajectory is a time series of spatial coordinates (TSSC) representing a path traversed by a respective object in the venue,
each TSSC is accompanied by at least one respective time series of sensing data (TSSD) collected while the respective object traverses the path in the venue, wherein the TSSC is time synchronized with the at least one respective TSSD;
segmenting each TSSC of each trajectory into a set of TSSC segments, each TSSC segment comprising a straight line segment and two turns at two ends of the straight line segment;
segmenting each TSSD accompanying the trajectory into a respective set of TSSD segments based on the set of TSSC segments of the accompanying TSSC, each TSSD segment being time synchronized with a corresponding TSSC segment of the accompanying TSSC;
matching a first TSSC segment of a first TSSC of a first trajectory with a second TSSC segment of a second TSSC of a second trajectory to generate a matched first TSSC segment and a matched second TSSC segment, wherein matching the first TSSC segment comprises:
determining a plurality of candidate TSSC segments among the plurality of trajectories for the first TSSC segment of the first trajectory,
computing a respective first angle differentiation between a first turning angle of the first TSSC segment and a respective first turning angle of each candidate TSSC segment,
computing a respective second angle differentiation between a second turning angle of the first TSSC segment and a respective second turning angle of each candidate TSSC segment,
computing a respective third angle differentiation between the first turning angle of the first TSSC segment and the respective second turning angle of each candidate TSSC segment,
computing a respective fourth angle differentiation between the second turning angle of the first TSSC segment and the respective first turning angle of each candidate TSSC segment,
rejecting any candidate TSSC segment when both a condition (1) and a condition (2) are true,
wherein the condition (1) is true when any of the following is true: (a) the respective first angle differentiation associated with the candidate TSSC segment is larger than a first threshold, (b) the respective second angle differentiation associated with the candidate TSSC segment is larger than a second threshold, or (c) an aggregate of the respective first angle differentiation and the respective second angle differentiation is larger than a third threshold,
wherein the condition (2) is true when any of the following is true: (d) the respective third angle differentiation associated with the candidate TSSC segment is larger than a fifth threshold, (e) the respective fourth angle differentiation associated with the candidate TSSC segment is larger than a sixth threshold, or (f) an aggregate of the respective third angle differentiation and the respective fourth angle differentiation is larger than a seventh threshold,
computing a respective length differentiation between a length of the first TSSC segment and a respective length of each candidate TSSC segment, rejecting any candidate TSSC segment when (d) the respective length differentiation is larger than a fourth threshold, computing a respective similarity measure between a first TSSD segment, of a first TSSD accompanying the first TSSC, associated with the first TSSC segment and a respective TSSD segment associated with each candidate TSSC segment, wherein the second TSSC segment is one of the candidate TSSC segments that is not rejected, and matching the first TSSC segment of the first TSSC with the second TSSC segment of the second TSSC based on the respective similarity measure between the first TSSD segment and a second TSSD segment associated with the second TSSC segment;

bundling the plurality of trajectories based on similarity measures between pairs of the TSSC segments;

fusing the bundled trajectories to generate fused trajectories;

computing a shape of the fused trajectories; and generating a map of the venue based on the computed shape.

\* \* \* \* \*